(12) United States Patent
Morimoto et al.

(10) Patent No.: US 10,232,852 B2
(45) Date of Patent: Mar. 19, 2019

(54) TRAVEL CONTROL APPARATUS

(71) Applicant: DENSO CORPORATION, Kariya, Aichi-pref. (JP)

(72) Inventors: Youhei Morimoto, Kariya (JP); Noriaki Ikemoto, Kariya (JP); Yuutarou Itou, Kariya (JP); Masuhiro Kondo, Kariya (JP); Takahiro Narita, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/567,454

(22) PCT Filed: Apr. 6, 2016

(86) PCT No.: PCT/JP2016/001924
§ 371 (c)(1),
(2) Date: Oct. 18, 2017

(87) PCT Pub. No.: WO2016/170745
PCT Pub. Date: Oct. 27, 2016

(65) Prior Publication Data
US 2018/0111618 A1   Apr. 26, 2018

(30) Foreign Application Priority Data

Apr. 21, 2015  (JP) .................................. 2015-86467

(51) Int. Cl.
*F02D 41/12* (2006.01)
*B60W 30/16* (2012.01)
(Continued)

(52) U.S. Cl.
CPC ............ *B60W 30/16* (2013.01); *B60W 10/06* (2013.01); *B60W 10/26* (2013.01); *B60W 20/00* (2013.01);
(Continued)

(58) Field of Classification Search
CPC ...... B60W 30/16; B60W 10/06; B60W 10/26; B60W 20/00; F02D 41/08; F02D 41/10;
(Continued)

(56) References Cited

U.S. PATENT DOCUMENTS 9,334,821 B2 * 5/2016 Matsumura ......... F02D 41/0295
9,458,781 B2 * 10/2016 Tanaka ................ F02D 41/0235
(Continued)

FOREIGN PATENT DOCUMENTS

| JP | 2007-291919 | 11/2007 |
|----|-------------|---------|
| JP | 2009-292291 | 12/2009 |
| JP | 2010-093947 | 4/2010  |

OTHER PUBLICATIONS

International Search Report for PCT/JP2016/001924, dated Jun. 28, 2016, 4 pages.
(Continued)

*Primary Examiner* — Hai H Huynh
*Assistant Examiner* — Gonzalo Laguarda
(74) *Attorney, Agent, or Firm* — Nixon & Vanderhye P.C.

(57) ABSTRACT

A travel control apparatus is provided with: a speed controller that controls speed of a vehicle having an internal combustion engine; and a determination part that determines an emission deterioration state of the internal combustion engine. The speed controller is configured to execute burn-and-coast control that repeatedly executes burn control in which the vehicle is accelerated by driving force of the internal combustion engine, and coasting control in which the vehicle is driven by inertia, by stopping the generation of the driving force or rotation of the internal combustion engine. The speed controller is configured to execute emission suppression control that suppresses emissions by adjusting the burn-and-coast control when the emission deterioration state of the internal combustion engine is determined by the determination part.

17 Claims, 15 Drawing Sheets

(51) Int. Cl.
  *B60W 10/06* (2006.01)
  *B60W 10/26* (2006.01)
  *B60W 20/00* (2016.01)
  *B60W 30/182* (2012.01)
  *F02D 41/08* (2006.01)
  *F02D 41/10* (2006.01)
  *B60W 30/14* (2006.01)
  *F01N 11/00* (2006.01)

(52) U.S. Cl.
  CPC ........ *B60W 30/143* (2013.01); *B60W 30/182* (2013.01); *F02D 41/08* (2013.01); *F02D 41/10* (2013.01); *B60W 2510/068* (2013.01); *B60W 2510/0676* (2013.01); *B60W 2710/242* (2013.01); *B60W 2720/10* (2013.01); *B60Y 2200/92* (2013.01); *F01N 11/007* (2013.01); *Y02T 10/52* (2013.01); *Y10S 903/93* (2013.01)

(58) Field of Classification Search
  CPC ...... F02D 41/12; F02D 41/123; F02D 41/126; F02D 41/1446; F02D 41/024; F02D 41/045; F02D 41/086; F02D 2200/021; F02D 2200/0802

USPC ............... 123/436, 672, 675, 676, 492, 493; 701/103, 104, 110, 112
  See application file for complete search history.

(56) References Cited

U.S. PATENT DOCUMENTS

| | | | |
|---|---|---|---|
| 9,790,867 B2* | 10/2017 | Carlson | F02D 17/02 |
| 2010/0006078 A1* | 1/2010 | Shoda | F01N 3/2006 |
| | | | 123/676 |
| 2010/0152990 A1 | 6/2010 | Bjernetun et al. | |
| 2011/0041810 A1 | 2/2011 | Nakasaka | |
| 2013/0116907 A1 | 5/2013 | Bjernetun et al. | |
| 2014/0172264 A1 | 6/2014 | Bjernetun et al. | |
| 2014/0195135 A1 | 7/2014 | Miyazaki et al. | |
| 2015/0330315 A1* | 11/2015 | Takahashi | F02B 75/04 |
| | | | 123/48 A |
| 2016/0115932 A1* | 4/2016 | Shafto | B60W 10/04 |
| | | | 123/179.4 |

OTHER PUBLICATIONS

Written Opinion of the ISA for PCT/JP2016/001924, dated Jun. 28, 2016, 6 pages.

* cited by examiner

TRAVEL CONTROL APPARATUS

CROSS REFERENCE TO RELATED APPLICATIONS

The present application is the U.S. national phase of International Application No. PCT/2016/001924 filed Apr. 6, 2016 which designated the U.S. and claims priority to Japanese Patent Application No. 2015-86467 filed Apr. 21, 2015, the entire contents of each of which are incorporated herein by reference.

TECHNICAL FIELD

The present disclosure relates to a travel control apparatus that controls travel of a vehicle provided with an internal combustion engine.

BACKGROUND ART

In order to improve fuel consumption of a vehicle, a travel control apparatus that performs burn-and-coast control is known (for example, see Patent Literatures 1, 2). The burn-and-coast control refers to control which repeats control (burn control) in which a vehicle is accelerated by driving force of an internal combustion engine and control (coasting control) in which generation of the driving force of the Internal combustion engine or rotation of the internal combustion engine is stopped so that the vehicle travels by inertia.

In such burn-and-coast control, the internal combustion engine is operated in a condition (high load) with relatively high efficiency or the operation of the Internal combustion engine is stopped. Accordingly, a period in which the internal combustion engine is operated in a condition (low load) with relatively low efficiency becomes short (or becomes zero), and thus the fuel efficiency is improved compared to a case where constant speed travel Is executed.

In a hybrid vehicle or the like capable of compensating travel force when the internal combustion engine is stopped by driving force of a rotation electric machine, it is considered that an effect of the improvement of the fuel efficiency by the burn-and-coast control is large.

PRIOR ART LITERATURES

Patent Literatures

Patent Literature 1: JP 2010-93947 A
Patent Literature 2: JP 2007-291919 A

SUMMARY

When the burn-and-coast control is executed, the internal combustion engine is stopped in the coasting control. The present inventors have found that emission of the internal combustion engine might be deteriorated depending on the condition, due to the stop of the internal combustion engine in executing the burn-and-coasting control, compared to a case where a low speed travel is executed.

An object of the present disclosure is to provide a travel control apparatus capable of suppressing deterioration of emission of an internal combustion engine by appropriately executing burn-and-coast control.

A travel control apparatus according to one example of the present disclosure includes: a speed controller that controls speed of a vehicle having an internal combustion engine; and a determination part that determines an emission deterioration state of the internal combustion engine. The speed controller is configured to execute burn-and-coast control that repeatedly executes burn control in which the vehicle is accelerated by driving force of the Internal combustion engine, and coasting control in which generation of the driving force or rotation of the internal combustion engine is stopped so that the vehicle travels by inertia. The speed controller is configured to execute emission suppression control that suppresses emission by adjusting the burn-and-coast control when the emission deterioration state of the internal combustion engine is determined by the determination part.

According to such a travel control apparatus, stop or restart of the internal combustion engine in the emission deterioration state can be prevented by executing the emission suppression control when the emission deterioration state is determined. Accordingly, decrease in a cooling water temperature and a catalyst temperature due to the stop of the internal combustion engine can be suppressed, and increase in emission due to the restart of the internal combustion engine can be suppressed.

According to the present disclosure, the travel control apparatus capable of suppressing the deterioration of the emission of the internal combustion engine by more appropriately executing the burn-and-coast control can be provided.

BRIEF DESCRIPTION OF DRAWINGS

The above and other aspects, features and advantages of the present disclosure will become more apparent from the following detailed description made with reference to the accompanying drawings. In the drawings.

DESCRIPTION OF EMBODIMENTS

Figure 1:
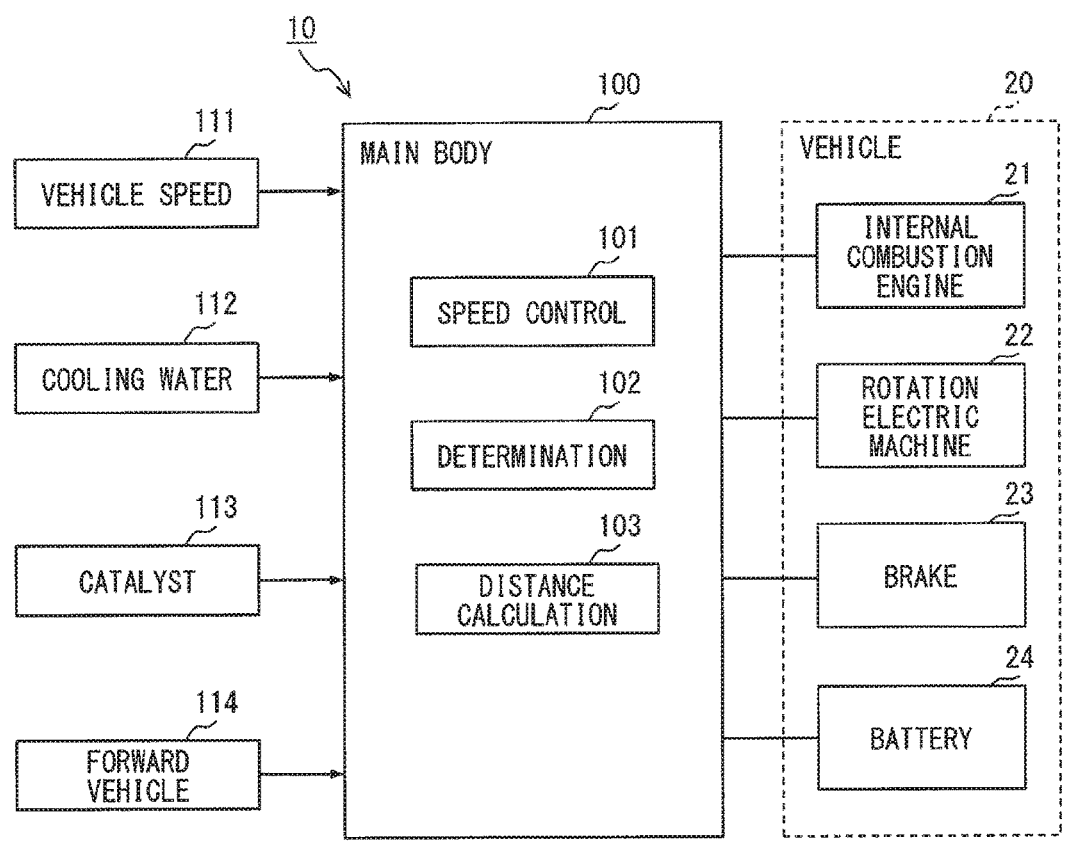
FIG. 1 is a block diagram illustrating a schematic configuration of a travel control apparatus according to a first embodiment of the present disclosure.

Hereinafter, embodiments of the present disclosure are described with reference to drawings. In order to facilitate understanding of the description, the same reference numeral is assigned to the same component in each figure as much as possible, and the repeated description thereof is therefore omitted.

(First Embodiment)

A first embodiment is described with reference to FIG. 1 to FIG. 6.

A travel control apparatus 10 according to the present embodiment is a control apparatus for controlling travel of a vehicle 20. "To control the travel" means, for example, to execute control to automate a part of operation of a driver by performing driving of a powertrain or braking of the vehicle 20 such that each of a speed, acceleration and deceleration of the vehicle 20 coincides with each target value. The details of the control are described below.

First, the vehicle 20 which is a target of the control by the travel control apparatus 10 is described with reference to FIG. 1. The vehicle 20 is a hybrid vehicle, and the vehicle 20 is provided with an internal combustion engine 21, a rotation electric machine 22, a braking device 23, and a battery 24 (corresponding to one example of a power storage device).

The internal combustion engine 21 as a driving source generates driving force by combustion of mixture gas of fuel and air in a cylinder (not shown) and rotating a crank shaft (not shown) by expansion of the gas due to the combustion. The driving force is used as force to rotate a wheel (not shown) installed in the vehicle 20, namely, used as travel force of the vehicle 20. Operation of the internal combustion engine 21 is controlled by the travel control apparatus 10. The internal combustion engine 21 is also called an engine.

The rotation electric machine 22 as a driving source is an electric motor, and generates driving force (electromagnetic force) when receiving electric power from the battery 24. The driving force is used as the travel force of the vehicle 20 together with the driving force of the internal combustion engine 21 or instead of the driving force of the internal combustion engine 21. Operation of the rotation electric machine 22 is controlled by the travel control apparatus 10.

The braking device 23 converts kinetic energy of the vehicle 20 into thermal energy by friction, and thereby the braking device 23 decelerates the vehicle 20. Further, the braking device 23 converts the kinetic energy of the vehicle 20 into electric energy by using the rotation electric machine 22, and thereby the braking device 23 can also decelerate the vehicle 20 (regenerative braking). Operation of the braking device 23 is controlled by the travel control apparatus 10.

The battery 24 is a secondary battery which accumulates electric power to be supplied to the rotation electric machine 22. The battery 24 can be charged, for example, by accumulating electric energy generated by the regenerative braking described above. That is, charging can be performed by using at least a part of output of the internal combustion engine 21. Charging operation to the battery 24 is controlled by the travel control apparatus 10.

Subsequently, a configuration of the travel control apparatus 10 is described with reference to FIG. 1. The travel control apparatus 10 is provided with a main body 100 and various sensors (a vehicle speed sensor 111 and the like).

The main body 100 is configured as a computer system provided with a CPU, a ROM, a RAM, and an input/output Interface and formed as a center of the travel control apparatus 10. The main body 100 is mounted, for example, as a part of an ECU (electronic control unit) of the vehicle 20. The main body 100 is provided with a speed controller 101, a determination part 102, and a distance calculator 103 as functional control blocks.

The speed controller 101 controls speed or acceleration of the vehicle 20. The determination part 102 determines an emission deterioration state of the internal combustion engine 21 based on various operation states of the vehicle 20. The distance calculator 103 calculates a vehicular distance to a vehicle travelling ahead or a relative speed with respect to the vehicle based on information input from a forward vehicle sensor 114 described below. The detailed functions of the speed controller 101, the determination part 102 and the distance calculator 103 are described below.

The travel control apparatus 10 is provided with the vehicle speed sensor 111, a cooling water temperature sensor 112, a catalyst temperature sensor 113, and the forward vehicle sensor 114 as sensors for acquiring various types of information relating to the vehicle 20 and a surrounding environment thereof. The measurement result of each of these sensors is sent to the main body 100 by an electric signal.

The vehicle speed sensor 111 measures a speed of the vehicle 20 (hereinafter, also referred to as "vehicle speed"). Herein, the "speed" refers to a speed of the travelling vehicle 20 with respect to the road.

The cooling water temperature sensor 112 measures a temperature of cooling water in the internal combustion engine 21. The catalyst temperature sensor 113 measures a temperature of a catalyst (not shown) provided for purifying exhaust gas of the internal combustion engine 21.

The forward vehicle sensor 114 measures the vehicular distance to other vehicle travelling ahead of the vehicle 20. As the forward vehicle sensor 114, for example, a millimeter wave radar may be used. Further, a device may be adopted in which the forward vehicle is photographed by a camera and the vehicular distance is calculated by image processing performed on the obtained image. The main body 100 can detect not only the vehicular distance based on the forward vehicle sensor 114 but also a relative speed to the forward vehicle based on change with time of the vehicular distance.

Figure 2:
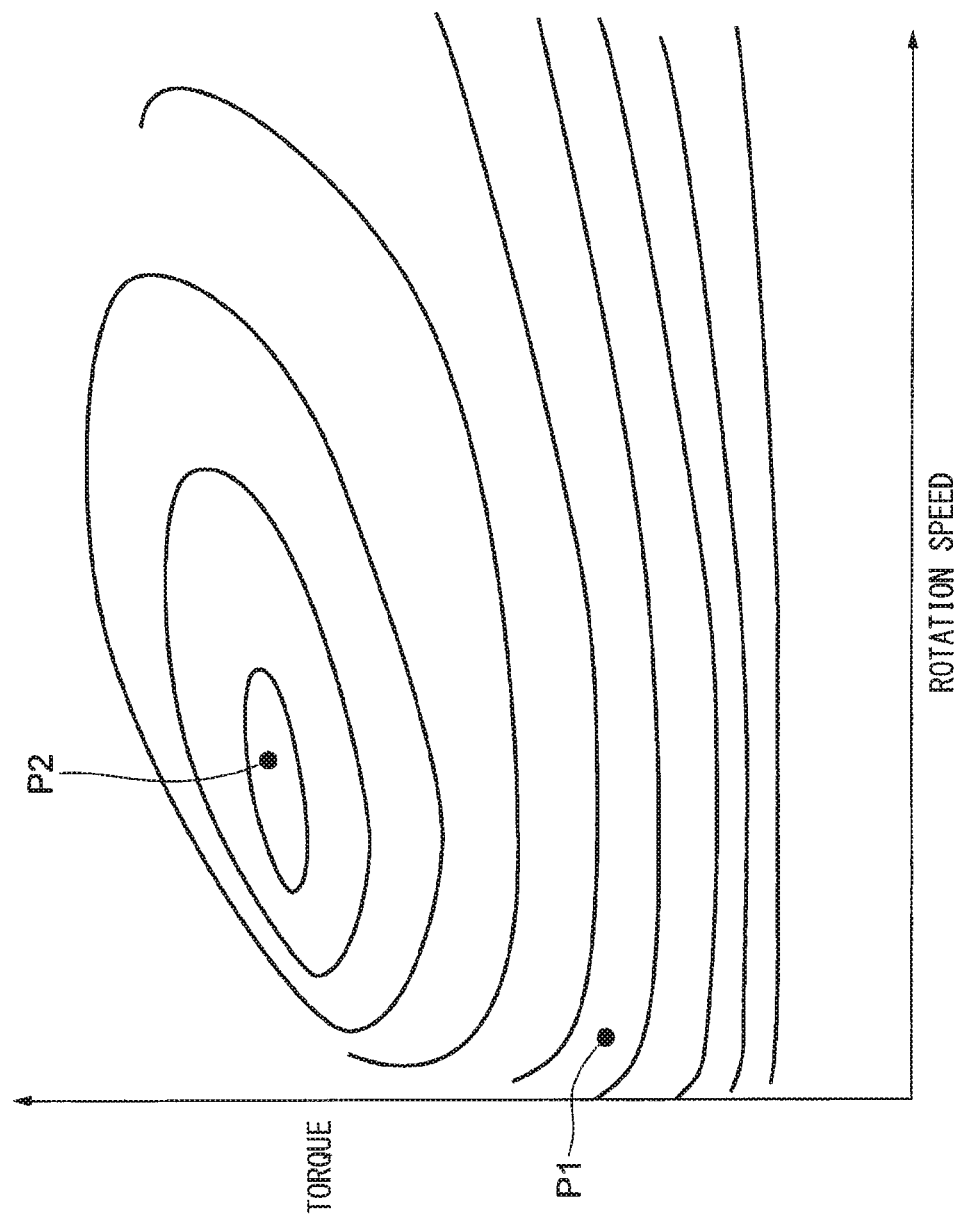
FIG. 2 is a diagram illustrating a relationship between rotation speed and torque of the internal combustion engine and operation efficiency.

The operation efficiency of the Internal combustion engine 21 is described with reference to FIG. 2. It is known that the operation efficiency of the internal combustion engine 21 is not always constant and the operation efficiency of the internal combustion engine 21 is changed in accordance with generated torque (load) or a rotation speed. FIG. 2 is a diagram showing the operation efficiency of the internal combustion engine 21 in various operation conditions (coordinates determined by the rotation speed and the torque) by a contour line when a horizontal axis indicates the rotation speed of the internal combustion engine 21 and a vertical axis indicates the torque.

As shown in FIG. 2, at the coordinates P2 where the torque is relatively large, the operation efficiency of the internal combustion engine 21 becomes a maximum, while at the coordinates P1 where the torque is smaller and the rotation speed is lower than the coordinates P2, the operation efficiency of the internal combustion engine 21 is low. Thus, from a viewpoint of the operation efficiency, it is preferable that a state in which the internal combustion engine 21 is driven at a high rotation speed and a high load is kept intermittently compared to a state in which the vehicle 20 travels at a constant speed, namely, the state in which the internal combustion engine 21 is driven at a low rotation speed and a low load.

Thus, in the travel control apparatus 10 according to the present embodiment, the operation efficiency can be enhanced by executing the burn-and-coast control. The burn-and-coast control refers to control that repeats control (burn control) in which the vehicle 20 is accelerated by the driving force of the internal combustion engine 21 and control (coasting control) in which generation of the driving force of the internal combustion engine 21 or rotation of the internal combustion engine 21 is stopped so that the vehicle 20 travels by inertia.

Figure 3:
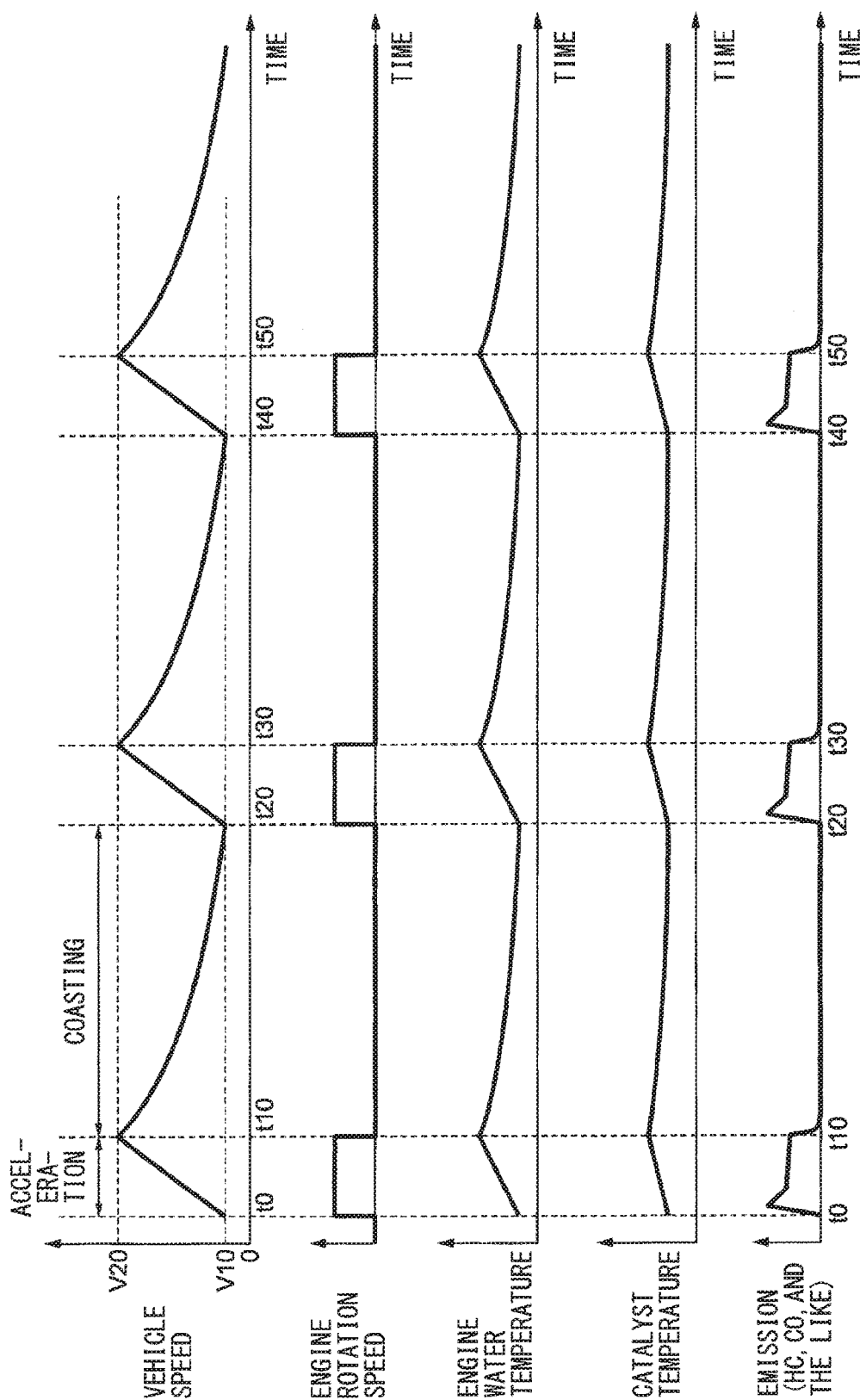
FIG. 3 is a diagram for describing burn-and-coast control.

One example of the burn-and-coast control is described with reference to FIG. 3. A vehicle speed in FIG. 3 is a graph showing change in the speed of the vehicle 20 with time when the burn-and-coast control is executed. An engine rotation speed in FIG. 3 is also a graph showing change in output of the internal combustion engine 21 with time when the burn-and-coast control is executed, and the rotation speed of the internal combustion engine 21 (the engine rotation speed) is shown as one example. An engine water temperature, a catalyst temperature and emission in FIG. 3 are also graphs showing changes in a cooling water temperature (engine water temperature), a catalyst temperature and emission (HC, CO or the like) of the internal combustion engine 21 with time when the burn-and-coast control is executed.

In the example shown in FIG. 3, in each of a period from time t0 to time t10, a period from time t20 to time t30, and a period from time t40 to time t50, the burn control is executed. In the burn control, the driving force of the internal combustion engine 21 is adjusted such that the acceleration of the vehicle 20 coincides with target acceleration. Thus, as shown by the vehicle speed in FIG. 3, the vehicle speed is increased at a constant inclination (namely, acceleration) in the period in which the burn control is executed.

In a period in which the burn control is not executed, that is, in each of a period from time t10 to time t20, and a period from time t30 to time t40, the coasting control is executed. In the coasting control, generation of the driving force of the internal combustion engine 21 or rotation of the Internal combustion engine 21 is stopped. Transmission of the driving force and the braking force to a driving wheel of the vehicle 20 is interrupted, and therefore the vehicle 20 travels only by inertia (inertia energy).

At this time, the speed of the vehicle 20 is gradually decreased due to influence of air resistance or the like on the vehicle 20. Thus, as shown by the engine rotation speed in FIG. 3, the vehicle speed is decreased at a substantially constant inclination (namely, deceleration) in the period in which the coasting control is executed.

As a result of alternately repeating the burn control and the coasting control described above, the speed of the vehicle 20 is set in a range between a lower limit speed V10 and an upper limit speed V20. In other words, the burn control is executed until the vehicle speed becomes the preset upper limit speed V20. Further, the coasting control is executed until the vehicle speed becomes the preset lower limit speed V10.

In the following description, a vehicle speed range between the lower limit speed V10 and the upper limit speed V20 is also described as "vehicle speed range VR". The vehicle speed range VR is one of the parameters which specify a specific mode of the burn-and-coast control together with the target acceleration described above.

As a result of executing the burn-and-coast control described above, the internal combustion engine 21 of the vehicle 20 is switched between a state in which the driving force is generated with relatively high operation efficiency (the burn control) and a state in which the generation of the driving force or the rotation is stopped and the fuel is not consumed (the coasting control). That is, in a state in which the driving force is generated, only the operation at the coordinates P2 shown in FIG. 2 or near the coordinates P2 is performed, and therefore the operation at the coordinates P1 which corresponds to relatively low efficiency (constant speed travel state) is not performed. As a result, compared to a case where the constant speed travel is performed, the fuel efficiency of the vehicle 20 can be improved.

Further, a period in which the vehicle speed is constant may be provided between the period in which the burn control is executed and the period in which the coasting control is executed.

In the burn-and-coast control, since the burn control in which the internal combustion engine 21 is driven and the coasting control in which the Internal combustion engine 21 is stopped (more specifically, the generation of the driving force or the rotation of the internal combustion engine 21 is stopped) are repeated as described above, it is necessary to restart the internal combustion engine 21 when the coasting control is switched to the burn control. Thus, since frequency of start of the internal combustion engine 21 is increased in executing the burn-and-coast control, an inlet air amount is insufficient and incomplete combustion occurs, and as a result, the emission may be Increased.

Further, when the internal combustion engine 21 is stopped during the coasting control, the engine water temperature is decreased as shown by the engine water temperature in FIG. 3. Thus, the incomplete combustion occurs when the internal combustion engine 21 is restarted because a combustion temperature is low, and the emission may be increased.

Similarly, when the internal combustion engine 21 is stopped during the coasting control, the catalyst temperature is decreased as shown by the catalyst temperature in FIG. 3. Thus, the catalyst temperature is hardly increased to an activation temperature of the catalyst when the internal combustion engine 21 is restarted, and the emission in the exhaust gas is not purified, and, the emission may be increased.

In this way, the emission is increased when the Internal combustion engine 21 is restarted in the conventional burn-and-coast control as shown by the emission in FIG. 3 due to increase in the number of times of the restart of the internal combustion engine 21 or decrease in the engine water temperature and the catalyst temperature, and therefore emission deterioration may occur.

Thus, in the present embodiment, in order to suppress the emission deterioration of the internal combustion engine 21 due to the burn-and-coast control, the travel control apparatus 10 is configured such that, when the emission deterioration state of the Internal combustion engine 21 is determined, "emission suppression control" in which the emission is suppressed by adjusting the burn-and-coast control to prevent the stop of the internal combustion engine 21 during the coasting control (more specifically, the stop of the generation of the driving force of the internal combustion engine 21 or the stop of the rotation of the internal combustion engine 21) is executed. Herein, "when the emission deterioration state of the internal combustion engine 21 is determined" means, specifically, "when deterioration of the emission at the current moment is detected based on the cooling water temperature and the catalyst temperature". Further, the emission suppression control means, specifically, "prohibiting the execution of the burn-and-coast control".

Figure 4:
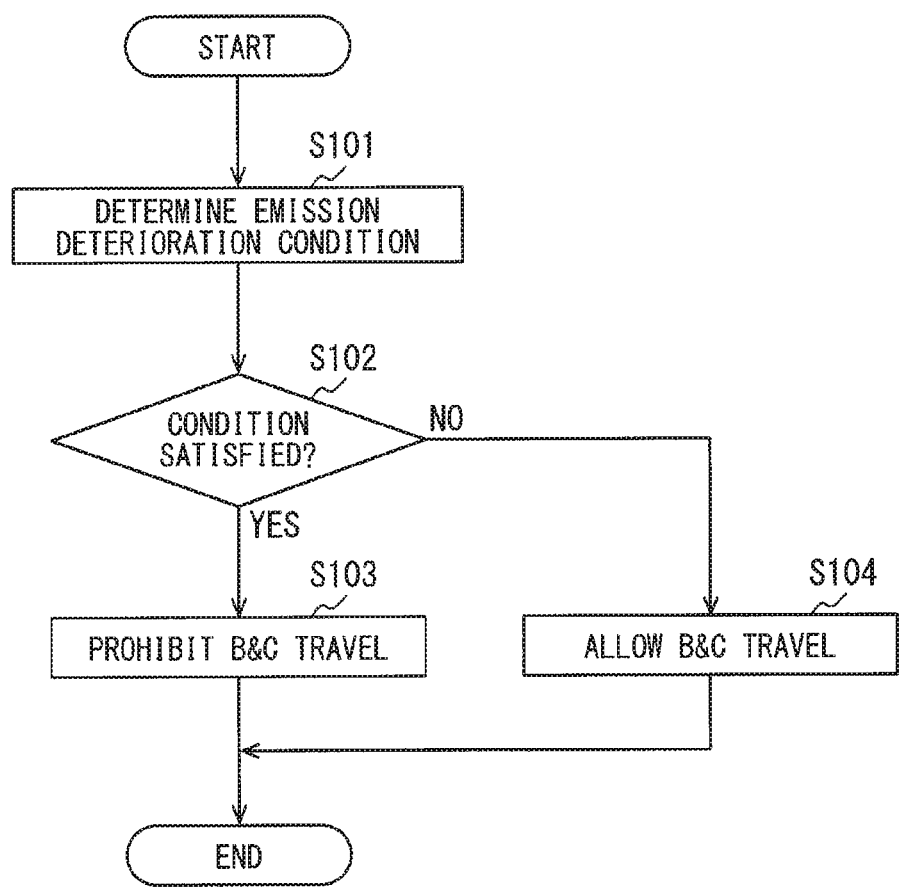
FIG. 4 is a flow chart of emission suppression control executed by the travel control apparatus according to the first embodiment.

A detailed procedure of the emission suppression control is described with reference to FIG. 4. A series of processing shown in the flow chart of FIG. 4 is repeatedly executed by the main body 100 every time a predetermined control period elapses.

In S101, whether an emission deterioration condition is satisfied is determined by the determination part 102. The determination part 102 determines that the emission deterioration condition is satisfied when both of an emission deterioration condition (1) and an emission deterioration condition (2) described below are satisfied, and outputs a determination result to the speed controller 101.

The emission deterioration condition (1): the cooling water temperature measured by the cooling water temperature sensor 112 is lower than a predetermined value (for example, 40 degrees Celsius).

The emission deterioration condition (2): the catalyst temperature measured by the catalyst temperature sensor 113 is lower than a predetermined value (for example, 200 degrees Celsius).

After the processing of S101 Is completed, the processing proceeds to S102. In the present step, the determination part 102 may be configured to determine that the emission deterioration condition is satisfied when only one of the emission deterioration condition (1) and the emission deterioration condition (2) is satisfied. Further, the emission deterioration condition may be set by using Information other than the cooling water temperature and the catalyst temperature as long as the emission deterioration at the current moment can be detected.

In S102, whether the emission deterioration condition is satisfied is determined by the speed controller 101. The speed controller 101 makes determination based on the determination result of the emission deterioration condition by the determination part 102. According to the result of the determination in S102, when the emission deterioration condition is satisfied (S102: Yes), the processing proceeds to S103, and when the emission deterioration condition is not satisfied (S102: No), the processing proceeds to S104.

In S103, the speed controller 101 determines that the emission deterioration condition is satisfied, and since the emission deterioration state in which the current emission is deteriorated can be determined, the travel of the vehicle 20 while executing the burn-and-coast control (described as "B&C travel" in the drawings) is prohibited. After the processing of S103 is completed, the present control flow is ended.

In S104, since the speed controller 101 determines that the emission deterioration condition is not satisfied, the travel of the vehicle 20 while executing the burn-and-coast control (B&C travel) is set to be allowed.

In this setting, the burn-and-coast control can be executed, for example, in accordance with an operation input (pressing a button or the like) by a driver of the vehicle 20. After the processing of S104 is completed, the present control flow is ended.

Next, the automatic following control is described with reference to FIG. 5 and FIG. 6. The automatic following control refers to control in which the vehicle 20 is made travel so as to automatically follow another vehicle (hereinafter, referred to as the "other vehicle FC") traveling ahead of the vehicle 20, the control being executed by the travel control apparatus 10. The automatic following control can be executed, for example, in accordance with an operation input (pressing a button or the like) by a driver of the vehicle 20.

Figure 5:
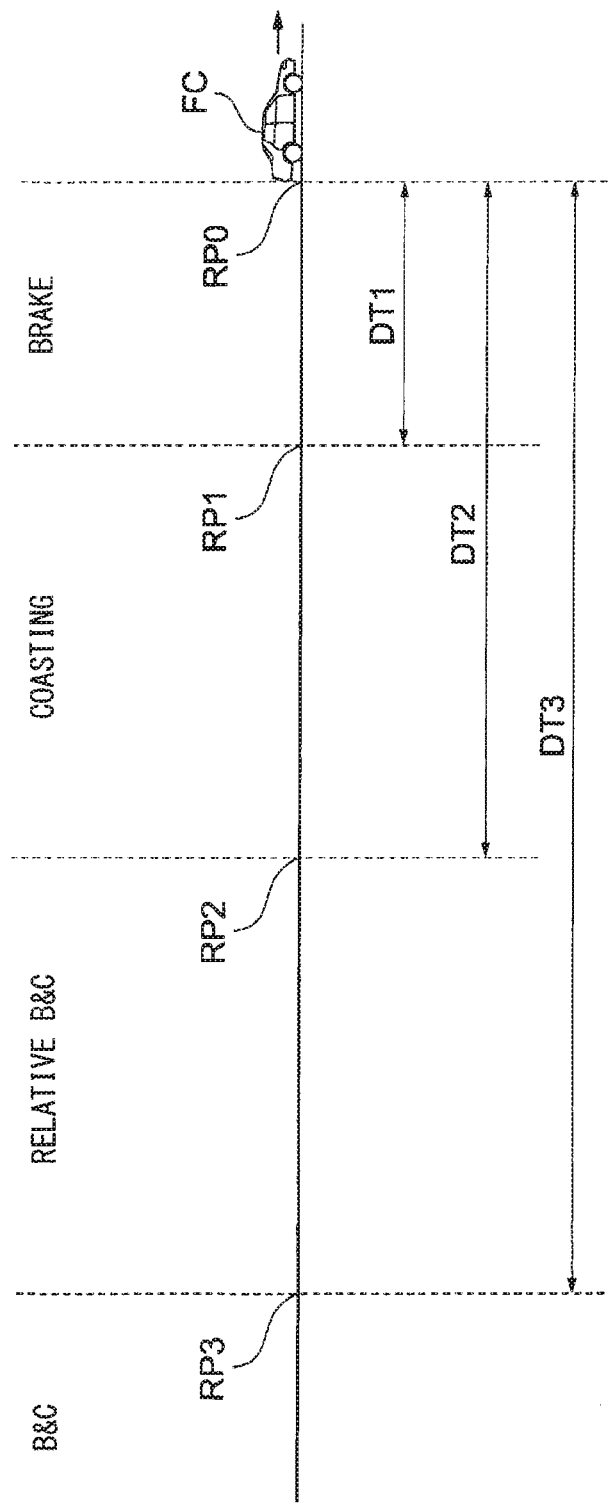
FIG. 5 is a diagram for describing automatic following control.

As the outline is shown in FIG. 5, in the automatic following control according to the present embodiment, when the distance between a rear end RP0 of the other vehicle FC and a front end of the vehicle 20 (hereinafter, simply referred to as "vehicular distance") is less than a predetermined distance DT1 (when the front end of the vehicle 20 is located ahead of a position RP1), the deceleration by operation of the braking device 23 is performed.

Further, when the vehicular distance is equal to or more than the distance DT1 and less than a predetermined distance DT2 (when the front end of the vehicle 20 is located between the position RP1 and a position RP2), only the coasting control is executed.

Further, when the vehicular distance is equal to or more than the distance DT2 and less than a predetermined distance DT3 (when the front end of the vehicle 20 is located between the position RP2 and a position RP3), the burn-and-coast control based on the relative speed is executed. "The burn-and-coast control based on the relative speed" is described below.

When the vehicular distance is equal to or more than the distance DT3 (when the front end of the vehicle 20 is located away from the position RP3), the burn-and-coast control as described above is executed.

Figure 6:
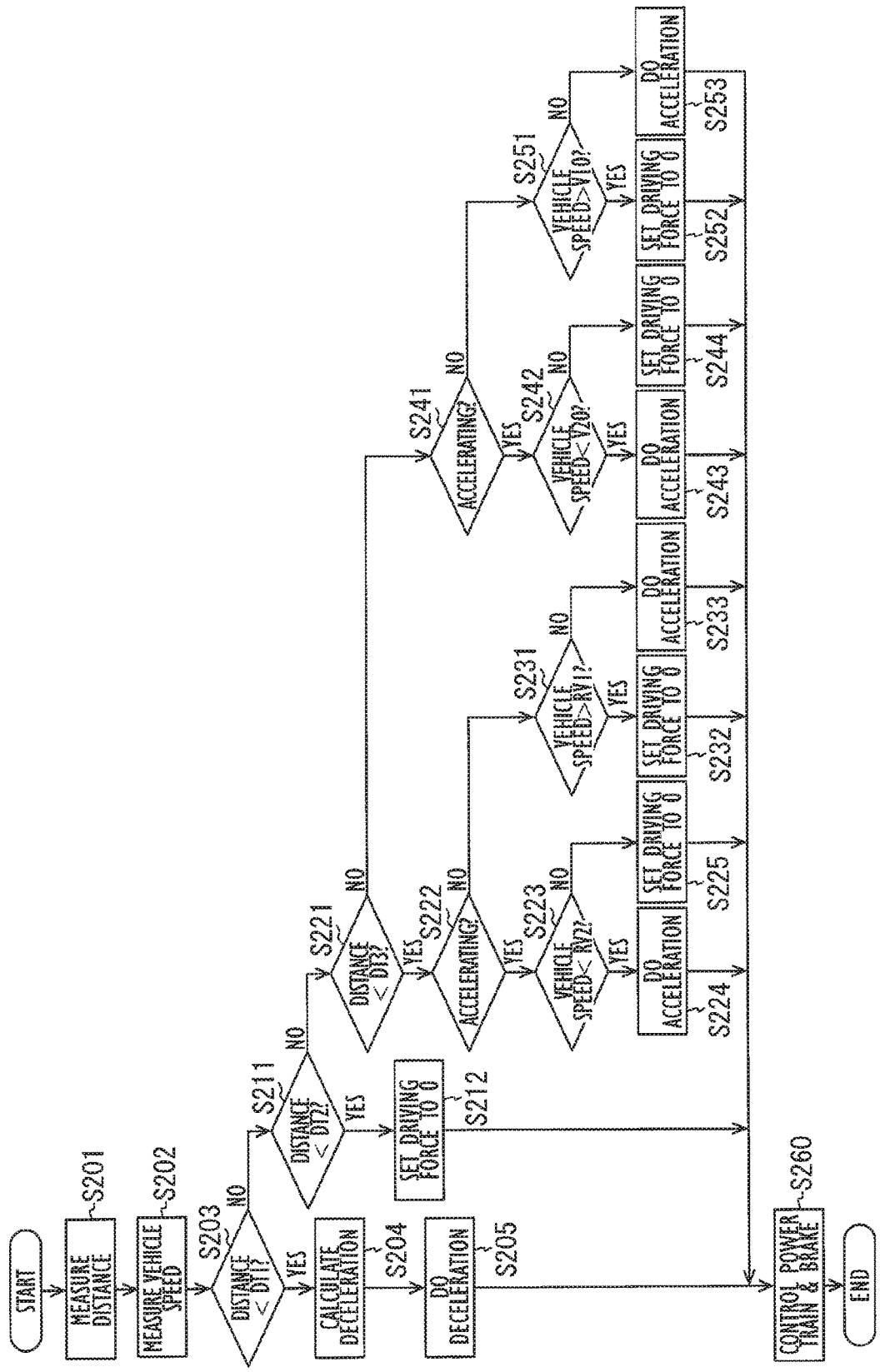
FIG. 6 is a flow chart illustrating a flow of specific processing in the automatic following control.

A series of processing shown in the flow chart of FIG. 6 is repeatedly executed by the main body 100 every time a predetermined control period elapses. In S201 at the start, the vehicular distance is measured. Specifically, the vehicular distance is calculated based on a measurement value of the forward vehicle sensor 114. The calculation of the vehicular distance is performed by the distance calculator 103.

In S202 following S201, a relative speed to the other vehicle FC, namely, a speed of the vehicle 20 relative to a speed of the other vehicle FC is measured. In the present embodiment, the relative speed is calculated based on the change with time of the measurement value of the forward vehicle sensor 114. The calculation of the relative speed is performed by the distance calculator 103. In the following description, when simply referring to "speed" or "vehicle speed", this indicates a speed with respect to the road.

In S203 following S202, it is determined whether the calculated vehicular distance is less than the distance DT1. When the vehicular distance is less than the distance DT1, the processing proceeds to S204.

In S204, the deceleration at the current moment is calculated. The calculation of the deceleration is performed by a method similar to the calculation method of the decelerations K1, K2 described with reference to FIG. 11.

In S205 following S204, deceleration instruction is issued. That is, a control instruction value in the main body 100 is changed such that control which decelerates the vehicle 20 (forcibly, not by inertia) is executed thereafter.

In S260 following S205, the control based on the control instruction value is executed by the speed controller 101. In this case, the braking device 23 is activated, and the vehicle 20 is decelerated either by friction braking or by regenerative braking. As a result, the vehicular distance gradually becomes larger, and becomes larger than the distance DT1 in the end.

When the vehicular distance is equal to or more than the distance DT1 in S203, the processing proceeds to S211. In S211, it is determined whether the vehicular distance is less than the distance DT2. When the vehicular distance is less than the distance DT2, the processing proceeds to S212.

In S212, the control instruction value is changed such that the generation of the driving force of the internal combustion engine 21 or the rotation of the internal combustion engine 21 is stopped and the vehicle 20 travels by the inertia thereafter. Thus, when the processing proceeds from S212 to S260, the coasting control is thereafter executed. Since the vehicle travels by the inertia, if the speed of the other vehicle FC is constant, the vehicular distance gradually (slowly) becomes larger.

When the vehicular distance is equal to or more than the distance DT2 In S211, the processing proceeds to S221. In S221, it is determined whether the vehicular distance is less than the distance DT3. When the vehicular distance is less than the distance DT3, the processing proceeds to S222.

In S222, it is determined whether the relative speed of the vehicle is increased, namely, whether the vehicle 20 is relatively accelerating with respect to the other vehicle FC. When the vehicle 20 is relatively accelerating, the processing proceeds to S223.

In S223, it is determined whether the relative speed is less than a preset upper limit speed RV2. When the relative speed is less than the upper limit speed RV2, the processing proceeds to S224. In S224, the control instruction value is changed such that the relative acceleration with respect to the other vehicle FC coincides with a predetermined target relative acceleration. Thus, when the processing proceeds to S260 from S224, the burn control is thereafter executed. The relative speed is gradually increased so as to be close to the upper limit speed RV2.

When the relative speed is equal to or more than the upper limit speed RV2 in S223, the processing proceeds to S225. In S225, the control instruction value is changed such that the generation of the driving force of the internal combustion engine 21 or the rotation of the internal combustion engine 21 is stopped and the vehicle 20 travels by the Inertia thereafter. Thus, when the processing proceeds from S225 to S260, the coasting control is thereafter executed. Since the vehicle 20 travels by the inertia, if the speed of the other vehicle FC is constant, the relative speed is gradually decreased so as to be close to a lower limit speed RV1 described below.

In S222, when the relative speed of the vehicle 20 is not Increasing, the processing proceeds to S231. In S231, it is determined whether the relative speed is more than a preset lower limit speed RV1. When the relative speed is more than the lower limit speed RV1, the processing proceeds to S232.

In S232, the control instruction value is changed such that the generation of the driving force of the internal combustion engine 21 or the rotation of the internal combustion engine 21 is stopped and the vehicle 20 travels by the inertia thereafter. Thus, when the processing proceeds from S232 to S260, the coasting control is thereafter executed. Since the vehicle travels by the inertia, if the speed of the other vehicle FC is constant, the relative speed is gradually decreased so as to be close to the lower limit speed RV1.

In S231, when the relative speed is equal to or less than the lower limit speed RV1, the processing proceeds to S233. In S233, the control instruction value is changed such that the relative acceleration with respect to the other vehicle FC coincides with the target relative acceleration. Thus, when the processing proceeds from S233 to S260, the burn control is thereafter executed. The relative acceleration is gradually increased so as to be close to the upper limit speed RV2.

As is apparent from the description above, the control (S222, S223, S224, S225, S231, S232, S233) executed after the vehicular distance is determined to be less than the distance DT3 in S221 is configured such that the relative speed is set in a range between the lower limit speed RV1 and the upper limit speed RV2 by repeating a state (the burn control) in which the relative acceleration of the vehicle 20 coincides with the target acceleration and a state (the coasting control) in which the internal combustion engine 21 is stopped so that the vehicle 20 travels by the inertia. That is, it is deemed to be control such that the vehicle speed range in the burn-and-coast control described with reference to FIG. 3 or the like is set as a region for the relative speed, namely, the burn-and-coast control based on the relative speed.

In S221, when the vehicular distance is equal to or more than the distance DT3, the processing proceeds to S241. In S241, it is determined whether the speed of the vehicle 20 (with respect to the road) is increasing, namely, whether the vehicle 20 is accelerating. When the vehicle 20 is accelerating, the processing proceeds to S242.

In S242, it is determined whether the speed of the vehicle 20 is less than the upper limit speed V20. When the vehicle speed is less than the upper limit speed V20, the processing proceeds to S243. In S243, the control instruction value is changed such that the vehicle speed coincides with the target acceleration. Thus, when the processing proceeds from S243 to S260, the burn control is thereafter executed. The vehicle speed is gradually increased so as to be close to the upper limit speed V20.

In S242, when the vehicle speed is equal to or more than the upper limit speed V20, the processing proceeds to S244. In S244, the control instruction value is changed such that the generation of the driving force of the internal combustion engine 21 or the rotation of the internal combustion engine 21 is stopped and the vehicle 20 travels by the inertia thereafter. Thus, when the processing proceeds from S244 to S260, the coasting control is thereafter executed. Since the vehicle 20 travels by the inertia, the vehicle speed is gradually decreased so as to be close to the lower limit speed V10.

In S241, when the vehicle 20 is not accelerating, the processing proceeds to S251. In S251, it is determined whether the vehicle speed is more than the lower limit speed V10. When the vehicle speed is more than the lower limit speed V10, the processing proceeds to S252.

In S252, the control instruction value is changed such that the generation of the driving force of the internal combustion engine 21 or the rotation of the internal combustion engine 21 is stopped and the vehicle 20 travels by the inertia thereafter. Thus, when the processing proceeds from S252 to S260, the coasting control is thereafter executed. Since the vehicle travels by the inertia, the vehicle speed is gradually reduced so as to be close to the lower limit speed V10.

In S251, when the vehicle speed Is equal to or less than the lower limit speed V10, the processing proceeds to S253. In S253, the control Instruction value is changed such that the acceleration of the vehicle 20 (with respect to the road) coincides with the target acceleration. Thus, when the processing proceeds from S253 to S260, the burn control is thereafter executed. The vehicle speed is gradually increased so as to be close to the upper limit speed V20.

The control (S241, S242, S243, S244, S251, S252, S253) executed after the vehicular distance is determined to be equal to or more than the distance DT3 in S221 is the same as the control in which the vehicle speed is set within the range (the vehicle speed range VR) between the lower limit speed V10 and the upper limit speed V20, namely, the burn-and-coast control described above with reference to FIG. 3.

In the travel control apparatus 10 according to the present embodiment, the control of the vehicle 20 is changed in accordance with the length of the vehicular distance to the other vehicle FC. When the vehicular distance is less than the distance DT1, the deceleration of the vehicle 20 by the braking device 23 is forcibly executed, and thus the vehicular distance is prevented from becoming too short.

When the vehicular distance is equal to or more than the distance DT1 and less than the distance DT2, the coasting control is executed. Accordingly, the improvement of the fuel efficiency due to the stop of the internal combustion engine 21 can be achieved while the vehicular distance is ensured to some extent.

When the vehicular distance is equal to or more than the distance DT2 and less than the distance DT3, the burn-and-coast control based on the relative speed is executed. Accordingly, the improvement of the fuel efficiency can be achieved by causing the internal combustion engine 21 to operate in a condition with high efficiency, while the vehicle 20 automatically follows the other vehicle FC traveling ahead of the vehicle 20.

When the vehicular distance is equal to or more than the distance DT3, the following after the other vehicle FC is stopped and the normal burn-and-coast control Is executed. Accordingly, even if the automatic following control is not executed, the improvement of the fuel efficiency due to the burn-and-coast control can be achieved.

Next, one example of an effect of the travel control apparatus 10 according to the first embodiment is described.

In the present embodiment, when deterioration of the emission is detected, the stop and the restart of the internal combustion engine 21 in the emission deterioration state can be prevented by prohibiting the execution of the burn-and-coast control. Thus, decrease in the cooling water temperature and the catalyst temperature due to the stop of the internal combustion engine 21 can be suppressed, and increase in the emission due to the restart of the internal combustion engine 21 can be suppressed. As a result, the burn-and-coast control can be executed in more appropriate timing, and the emission deterioration of the internal combustion engine 21 can be suppressed.

In the present embodiment, whether the emission is deteriorated is detected based on the cooling water temperature and the catalyst temperature having a strong correlation with the emission deterioration. Thus, the determination of the emission deterioration can be performed accurately, and the emission deterioration of the internal combustion engine 21 can more preferably be suppressed.

(Second Embodiment)

Figure 7:
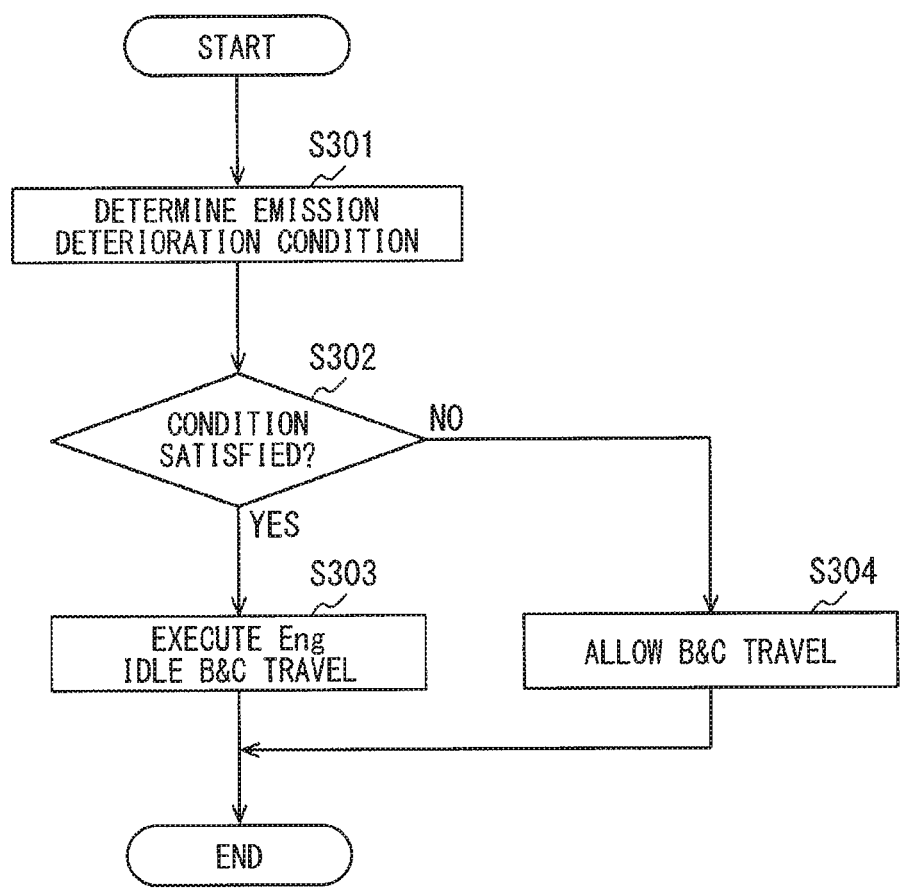
FIG. 7 is a flow chart of emission suppression control executed by a travel control apparatus according to a second embodiment.

Next, a second embodiment is described with reference to FIG. 7. A configuration of a travel control apparatus 10 according to the second embodiment is similar to that of the first embodiment shown in FIG. 1, and therefore an Illustration thereof is omitted.

In the travel control apparatus 10 according to the second embodiment, the content of the emission suppression control executed by a speed controller 101 when an emission deterioration condition is satisfied is different from that of the first embodiment. Specifically, in the first embodiment, the execution of the burn-and-coast control is prohibited, however, in the second embodiment, in the coasting control in the burn-and-coast control, the speed controller 101 switches to control in which idle operation is performed instead of stopping the internal combustion engine 21.

A procedure of the emission suppression control executed by the travel control apparatus 10 according to the second embodiment is described with reference to a flow chart in FIG. 7. A series of processing shown in FIG. 7 is repeatedly executed by the main body 100 every time a predetermined control period elapses.

In S301, whether an emission deterioration condition is satisfied is determined by a determination part 102. The specific content of the processing in the present step is similar to S101 (see FIG. 4) in the first embodiment. After the processing of S301 is completed, the processing proceeds to S102.

In S302, whether the emission deterioration condition is satisfied is determined by a speed controller 101. The specific content of the processing in the present step is similar to S102 (see FIG. 4) in the first embodiment. According to the result of the determination in S302, when the emission deterioration condition is satisfied (S302: Yes), the processing proceeds to S303, and when the emission deterioration condition is not satisfied (S302: No), the processing proceeds to S304.

In S303, the speed controller 101 determines that the emission deterioration condition is satisfied, and since the emission deterioration state in which the current emission is deteriorated can be determined, in the coasting control in the burn-and-coast control, control in which the idle operation of the internal combustion engine 21 is performed (described as "Eng idle B&C travel" in the drawing) is executed. After the processing of S303 is completed, the present control flow is ended.

In S304, since the speed controller 101 determines that the emission deterioration condition is not satisfied, the travel of the vehicle 20 while executing the burn-and-coast control (B&C travel) is set to be allowed. After the processing of S304 is completed, the present control flow is ended.

In this way, in the travel control apparatus 10 according to the second embodiment, the speed controller 101 switches to the control in which the idle operation is performed instead of stopping the internal combustion engine 21 in the coasting control in the burn-and-coast control, as the emission suppression control executed when the emission deterioration condition is satisfied. With this configuration, the internal combustion engine 21 is not stopped during the execution of the burn-and-coast control in the emission deterioration state, and the stop or the restart of the internal combustion engine 21 in the emission deterioration state can be prevented. Accordingly, decrease in the cooling water temperature and the catalyst temperature due to the stop of the internal combustion engine 21 can be suppressed, and increase in the emission due to the restart of the Internal combustion engine 21 can be suppressed. Further, since the internal combustion engine 21 is not stopped even if the coasting control is executed, an opportunity for executing the burn-and-coast control in the emission deterioration state can be increased. As a result, the emission deterioration of the internal combustion engine 21 can be suppressed while keeping the operation efficiency of the internal combustion engine 21 high.

(Third Embodiment)

Figure 8:
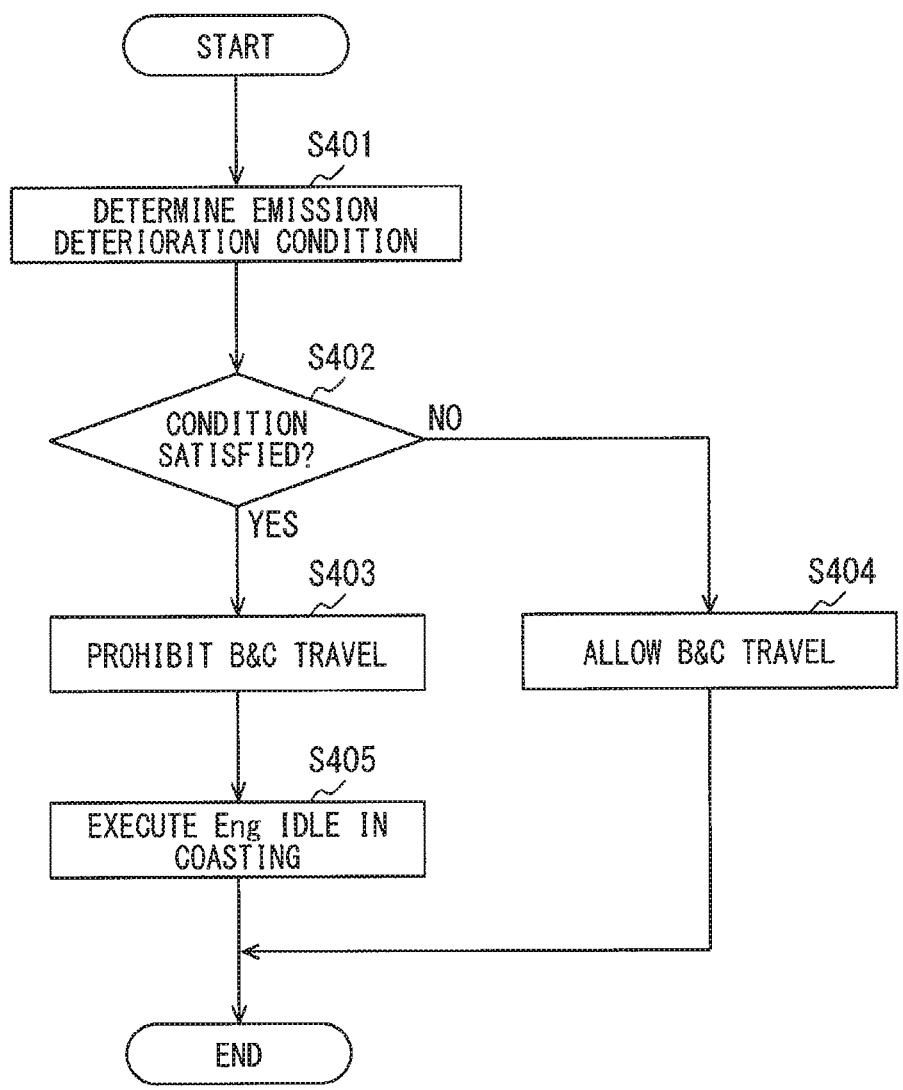
FIG. 8 is a flow chart of emission suppression control executed by a travel control apparatus according to a third embodiment.

Next, a third embodiment is described with reference to FIG. 8. A configuration of a travel control apparatus 10 according to the third embodiment is similar to that of the first embodiment shown in FIG. 1, and therefore an illustration thereof is omitted.

In the travel control apparatus 10 according to the third embodiment, the content of the emission suppression control executed by a speed controller 101 when an emission deterioration condition is satisfied is different from that of the first embodiment. Specifically, the burn-and-coast control is prohibited similar to the first embodiment, however, when the burn-and-coast control is prohibited, in a coasting control other than the burn-and-coast control, the speed controller 101 switches to control in which idle operation is performed instead of stopping the internal combustion engine 21.

A procedure of the emission suppression control executed by the travel control apparatus 10 according to the third embodiment is described with reference to a flow chart in FIG. 8. Since each processing of S401 to S404 is similar to each processing of S101 to S104 (see FIG. 4) in the first embodiment, the description thereof is omitted.

In S405, the control in which the idle operation of the internal combustion engine 21 (described as "Eng idle in coasting" in the drawing) is performed in the coasting control other than the burn-and-coast control in a state in which the burn-and-coast control is prohibited by the speed controller 101 in S403. Examples of "the coasting control other than the burn-and-coast control" include a situation in which only the coasting control is executed in the automatic following control as described with reference to, for example, FIG. 5. After the processing of S405 is completed, the present control flow is ended.

In this way, in the travel control apparatus 10 according to the third embodiment, when the burn-and-coast control is prohibited (namely, when the emission deterioration condition is satisfied), the speed controller 101 switches to the control in which the idle operation is performed instead of stopping the internal combustion engine 21 in the coasting control other than the burn-and-coast control. With this configuration, the number of times of the stop and the restart of the internal combustion engine 21 in the emission deterioration condition is further decreased, and therefore the emission deterioration of the internal combustion engine 21 can more preferably be suppressed.

(Fourth Embodiment)

Next, a fourth embodiment is described with reference to FIG. 9. A configuration of a travel control apparatus 10 according to the fourth embodiment is similar to that of the first embodiment shown in FIG. 1, and therefore an illustration thereof is omitted.

In the travel control apparatus 10 according to the fourth embodiment, the content of the emission suppression control executed by a speed controller 101 when an emission deterioration condition is satisfied Is different from that of the first embodiment. Specifically, the burn-and-coast control is prohibited similar to the first embodiment, however, when the burn-and-coast control is prohibited, output Increase control in which output of the internal combustion engine 21 is increased is executed. Specifically, the output increase control includes control in which acceleration with respect to an input for acceleration is increased.

A procedure of the emission suppression control executed by the travel control apparatus 10 according to the fourth embodiment is described with reference to a flow chart in FIG. 9. Since each processing of S501 to S504 is similar to each processing of S101 to S104 In the first embodiment, the description thereof is omitted.

In S505, the control in which the acceleration with respect to the input for acceleration is increased is executed as the output increase control by the speed controller 101 in a state in which the burn-and-coast control is prohibited in S503. More specifically, the speed controller 101 includes a plurality of maps in which, for example, different accelerations are set to the same accelerator opening, and the speed controller 101 can execute the processing of the present step by changing the map such that larger acceleration is set. After the processing of S505 is completed, the present control flow is ended.

Figure 9:
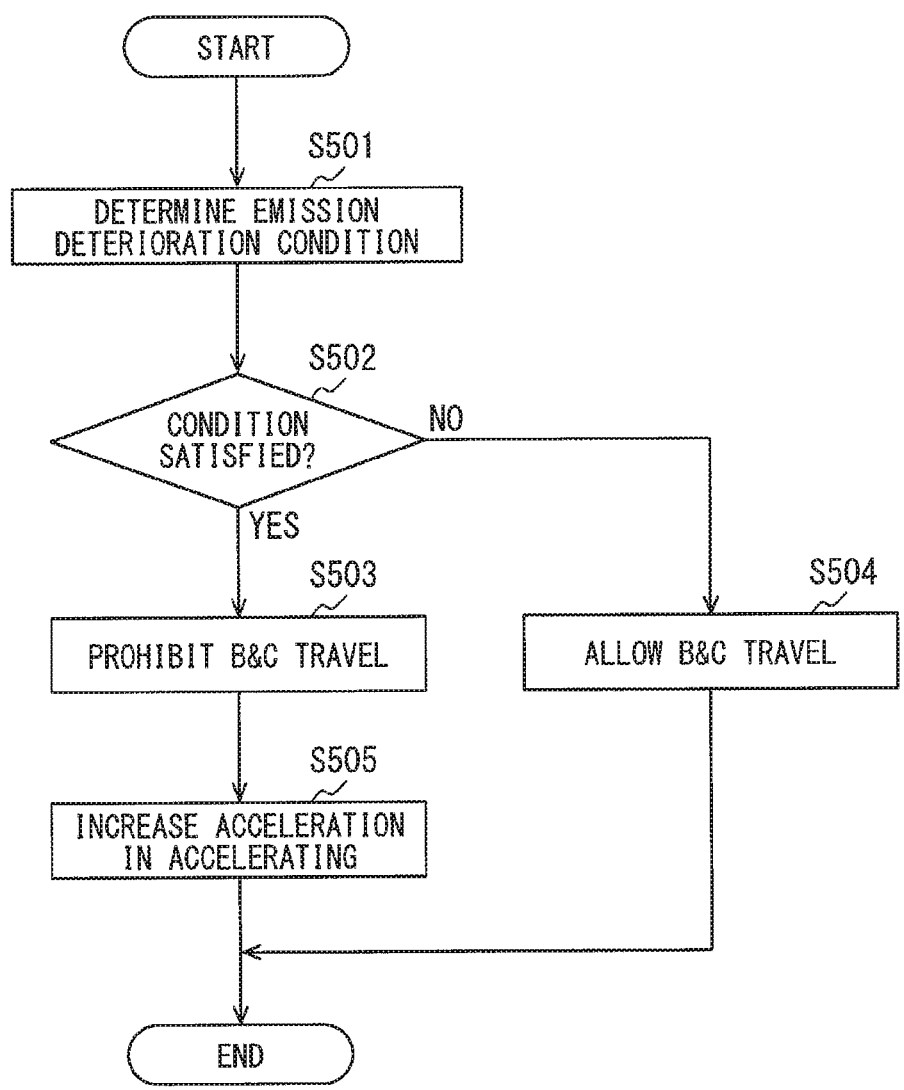
FIG. 9 is a flow chart of emission suppression control executed by a travel control apparatus according to a fourth embodiment.

Further, "control in which acceleration with respect to input for acceleration is increased" shown in S505 in the flow chart of FIG. 9 may be executed together with the control in which the burn-and-coast control is prohibited as shown in FIG. 9, and may be executed together with other emission suppression controls such as the control in which the idle operation is performed in the coasting control (S303 in the second embodiment (see FIG. 7) and S405 in the third embodiment (see FIG. 8)).

In this way, in the travel control apparatus 10 according to the fourth embodiment, the speed controller 101 executes the output increase control in which the output of the internal combustion engine 21 is increased when the emission suppression control is executed (namely, when the emission deterioration condition is satisfied), in particular, the control in which the acceleration with respect to the input for the acceleration is increased. With this configuration, the output of the internal combustion engine 21 can be improved by promoting the increase in the rotation speed of the Internal combustion engine 21 due to acceleration operation of the vehicle 20 in the emission deterioration state, and thereby decrease in the cooling water temperature and the catalyst temperature can be further suppressed. As a result, the emission deterioration of the internal combustion engine 21 can be further suppressed.

(Fifth Embodiment)

Next, a fifth embodiment is described with reference to FIG. 10. A configuration of a travel control apparatus 10 according to the fifth embodiment is similar to that of the first embodiment shown in FIG. 1, and therefore an illustration thereof is omitted.

In the travel control apparatus 10 according to the fifth embodiment, the content of the emission suppression control executed by a speed controller 101 when an emission deterioration condition is satisfied is different from that of the first embodiment. Specifically, the burn-and-coast control is prohibited similar to the first embodiment, however, when the burn-and-coast control is prohibited, output increase control in which output of the internal combustion engine 21 is increased is executed. Specifically, the output increase control includes control in which a charge amount of a battery 24 is Increased by the internal combustion engine 21.

A procedure of the emission suppression control executed by the travel control apparatus 10 according to the fifth embodiment is described with reference to a flow chart in FIG. 10. Since each processing of S601 to S604 is similar to each processing of S101 to S104 In the first embodiment, the description thereof is omitted.

In S605, the control in which the charge amount of the battery 24 is increased by the internal combustion engine 21 (described as "Eng charge amount is increased" in the drawing) is executed as the output increase control by the speed controller 101 in a state in which the burn-and-coast control is prohibited in S603. More specifically, the speed controller 101 can execute the processing of the present step by increasing the output of the internal combustion engine 21 such that, for example, a power generation amount due to regeneration brake of a rotation electric machine 22 is Increased. After the processing of S605 is completed, the present control flow is ended.

Figure 10:
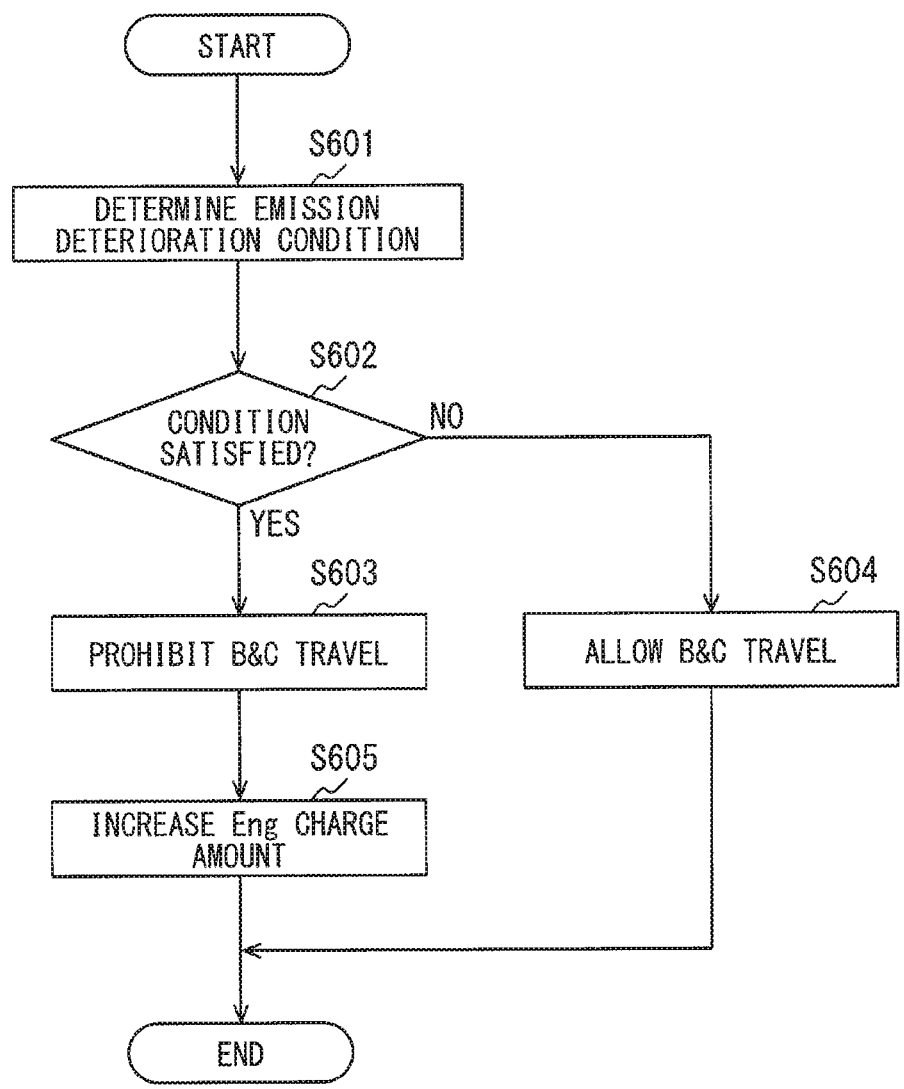
FIG. 10 is a flow chart of emission suppression control executed by a travel control apparatus according to a fifth embodiment.

Further, "control in which the charge amount of the battery 24 is increased by the Internal combustion engine 21" shown in S605 in the flow chart of FIG. 10 may be executed together with the control in which the burn-and-coast control is prohibited as shown in FIG. 10, and may be executed together with other emission suppression controls such as the control in which the idle operation is performed in the coasting control (S303 in the second embodiment (see FIG. 7) and S405 in the third embodiment (see FIG. 8)). Further, "control in which the charge amount of the battery 24 is increased by the internal combustion engine 21" may be executed together with "control in which acceleration with respect to input for acceleration is increased" shown in S505 in the fourth embodiment (see FIG. 9).

In this way, in the travel control apparatus 10 according to the fifth embodiment, the speed controller 101 executes the output increase control in which the output of the internal combustion engine 21 is increased when the emission suppression control is executed (namely, when the emission deterioration condition is satisfied), in particular, the control in which the charge amount of the battery 24 is increased by the internal combustion engine 21. With this configuration, the output of the internal combustion engine 21 can be Improved such that the power generation amount due to the regeneration brake of the rotation electric machine 22 is increased in the emission deterioration state. Accordingly, decrease in the cooling water temperature and the catalyst temperature can be further suppressed, and the emission deterioration of the internal combustion engine 21 can be further suppressed.

(Sixth Embodiment)

Figure 11:
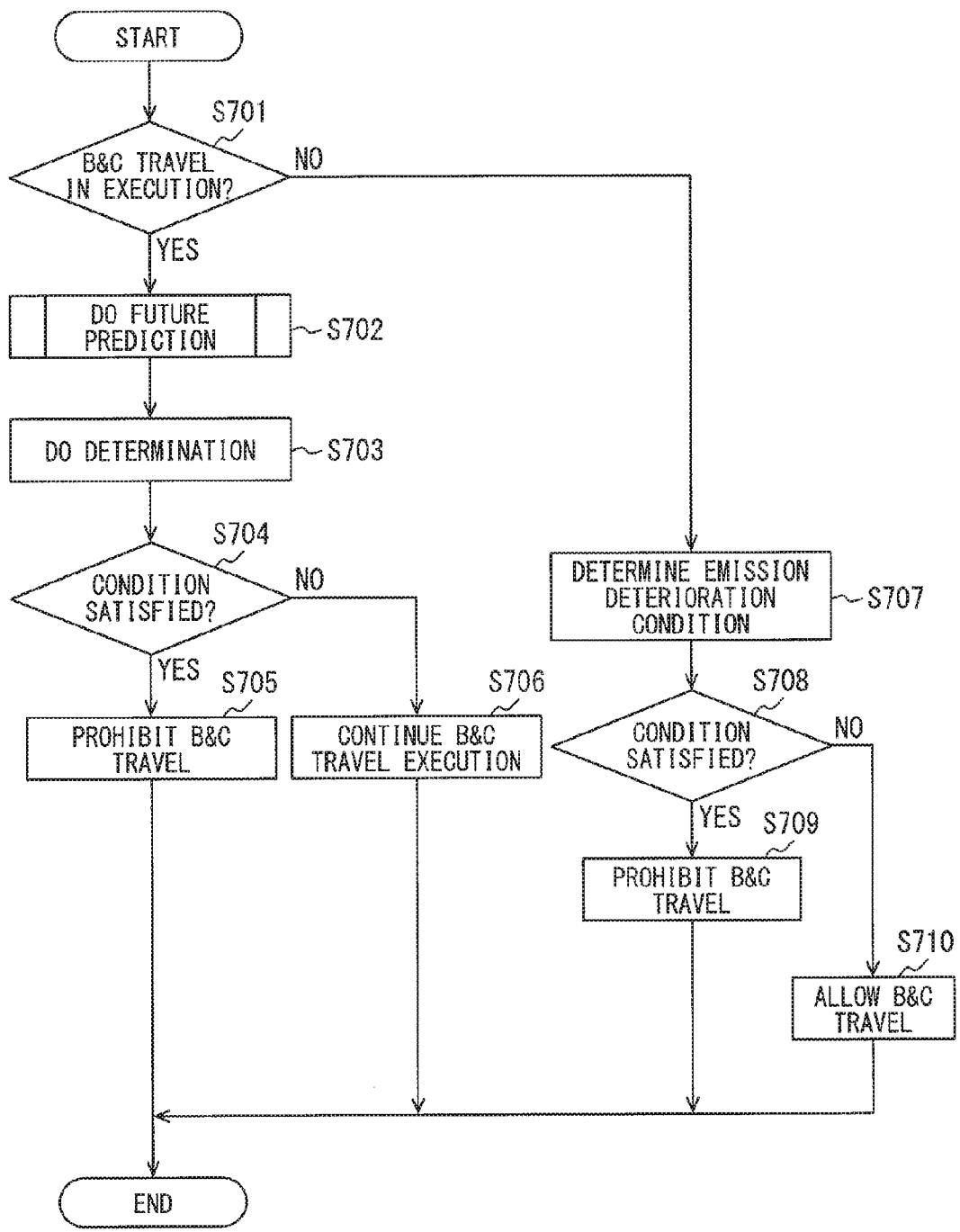
FIG. 11 is a flow chart of emission suppression control executed by a travel control apparatus according to a sixth embodiment.
Figure 12:
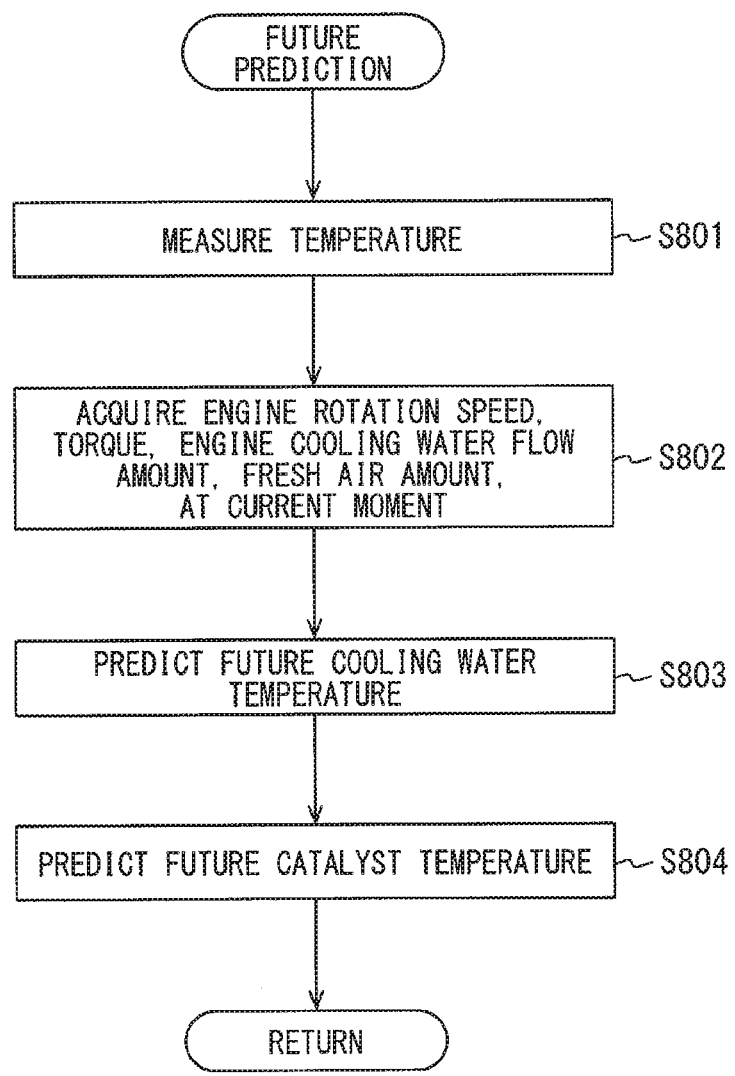
FIG. 12 is a flow chart illustrating a sub routine processing of "prediction processing of a future cooling water temperature and a future catalyst temperature" shown in S702 in FIG. 11.

Next, a sixth embodiment is described with reference to FIGS. 11 and 12. A configuration of a travel control apparatus 10 according to the sixth embodiment is similar to that of the first embodiment shown in FIG. 1, and therefore an illustration thereof is omitted.

In the travel control apparatus 10 according to the sixth embodiment, a determination method for an emission deterioration state by a determination part 102 is different from those of the first to fifth embodiments described above. Specifically, the determination part 102 determines the emission deterioration state when the deterioration of the emission is predicted. The prediction of the emission deterioration is performed based on a future cooling water temperature and a future catalyst temperature corresponding to prediction values in the near future of the cooling water temperature and the catalyst temperature of the internal combustion engine 21 which can be predicted by various types of sensor information at the current moment. That is, in the present embodiment, "when the emission deterioration state is determined" means, in particular, "when the deterioration of the emission is predicted based on the future cooling water temperature and the future catalyst temperature".

A procedure of the emission suppression control executed by the travel control apparatus 10 according to the sixth embodiment is described with reference to flow charts in FIGS. 11 and 12.

In S701, whether the burn-and-coast control is being executed is determined by a speed controller 101. When the burn-and-coast control is being executed (S701: Yes), the processing proceeds to S702. When the burn-and-coast control is not being executed (S701: No), the processing proceeds to S707.

In S702, the future cooling water temperature and the future catalyst temperature are predicted by the determination part 102. The prediction processing of the future cooling water temperature and the future catalyst temperature in S702 is described with reference to a sub routine in FIG. 12.

In S801, the cooling water temperature, the catalyst temperature and an outside air temperature at the current moment are measured. The cooling water temperature and the catalyst temperature can be measured by the cooling water temperature sensor 112 and the catalyst temperature sensor 113 shown in FIG. 1. The outside air temperature can be measured by using an outside air temperature sensor (not shown) mounted on the vehicle 20. After the processing of S801 is completed, the processing proceeds to S802.

In S802, a rotation speed, torque, a cooling water flow amount and a fresh air amount of the internal combustion engine 21 at the current moment are acquired. These pieces of information can be acquired by using various sensors mounted on the vehicle 20. After the processing of S803 is completed, the processing proceeds to S803.

In S803, the future cooling water temperature is predicted. The determination part 102, for example, calculates a heat amount transferred to the engine cooling water by using the engine rotation speed and the torque, and calculates a heat dissipation amount from the engine cooling water by using the cooling water temperature and the outside air temperature at the current moment. Further, the future cooling water is calculated by integrating the calculated heat amount and the calculated heat dissipation amount. After the processing of S803 is completed, the processing proceeds to S804.

In S804, the future catalyst temperature is predicted. The prediction method for the future catalyst temperature is similar to the calculation method of the future cooling water temperature in S803. After the processing of S804 is completed, the processing is returned to a main flow shown in FIG. 11.

Returning to FIG. 11, in S703, whether a future emission deterioration condition is satisfied is determined by the determination part 102. The determination part 102 determines that the future emission deterioration condition is satisfied when both of a future emission deterioration condition (1) and a future emission deterioration condition (2) described below are satisfied, and the determination part 102 outputs a determination result to the speed controller 101.

The future emission deterioration condition (1): the future cooling water temperature calculated in S702 is lower than a predetermined value (for example, 40 degrees Celsius).

The future emission deterioration condition (2): the future catalyst temperature calculated in S702 is lower than a predetermined value (for example, 200 degrees Celsius).

After the processing of S703 is completed, the processing proceeds to S704. Further, in the present step, the determination part 102 may be configured to determine that the future emission deterioration condition is satisfied when only one of the future emission deterioration condition (1) and the future emission deterioration condition (2) is satisfied. Further, the future emission deterioration condition may be set by using information other than the future cooling water temperature and the future catalyst temperature as long as the deterioration of the emission can be predicted.

In S704, whether the future emission deterioration condition is satisfied is determined by the speed controller 101. The speed controller 101 makes determination based on the determination result of the future emission deterioration condition by the determination part 102. According to the result of the determination in S704, when the future emission deterioration condition is satisfied (S704: Yes), the processing proceeds to S705, and when the future emission deterioration condition is not satisfied (S704: No), the processing proceeds to S706.

In S705, the speed controller 101 determines that the future emission deterioration condition is satisfied, and since the emission deterioration state in which the deterioration of the emission is predicted can be determined, the travel of the vehicle 20 while executing the burn-and-coast control (described as "B&C travel" in the drawing) is prohibited. After the processing of S705 is completed, the present control flow is ended.

In S706, since the speed controller 101 determines that the emission deterioration condition is not satisfied, the travel of the vehicle 20 while executing the burn-and-coast control (B&C travel) is continued. After the processing of S706 is completed, the present control flow is ended.

Each processing of S707 to S710 is executed when it is determined that the burn-and-coast control is not being executed in S701, however, the content of each processing is similar to each of S101 to S104 (see FIG. 4) of the first embodiment, and therefore the description thereof is omitted. That is, whether the emission at the current moment is deteriorated is determined based on the cooling water temperature and the catalyst temperature at the current moment, and the emission suppression control is executed in accordance with the determination result. A series of processing of S707 to S710 may be replaced with S301 to S304 (see FIG. 7) of the second embodiment, S401 to S405 (see FIG. 8) of the third embodiment, S501 to 8505 (see FIG. 9) of the fourth embodiment, or S601 to S605 (see FIG. 10) of the fifth embodiment.

With the travel control apparatus 10 according to the sixth embodiment, when the deterioration of the emission is predicted, the stop or the restart of the internal combustion engine 21 in the emission deterioration state can be prevented by prohibiting the execution of the burn-and-coast control. Accordingly, decrease in the cooling water temperature and the catalyst temperature due to the stop of the internal combustion engine 21 can be suppressed, and increase in the emission due to the restart of the internal combustion engine 21 can be suppressed. As a result, the burn-and-coast control can be executed in more appropriate timing, and the emission deterioration of the internal combustion engine 21 can be suppressed.

In the present embodiment, since whether the emission is deteriorated is predicted based on the prediction value of the cooling water temperature and the catalyst temperature having a strong correlation with the emission deterioration, the determination of the emission deterioration can be performed accurately. Therefore, the emission deterioration of the internal combustion engine 21 can more preferably be suppressed.

(Seventh Embodiment)

Figure 13:
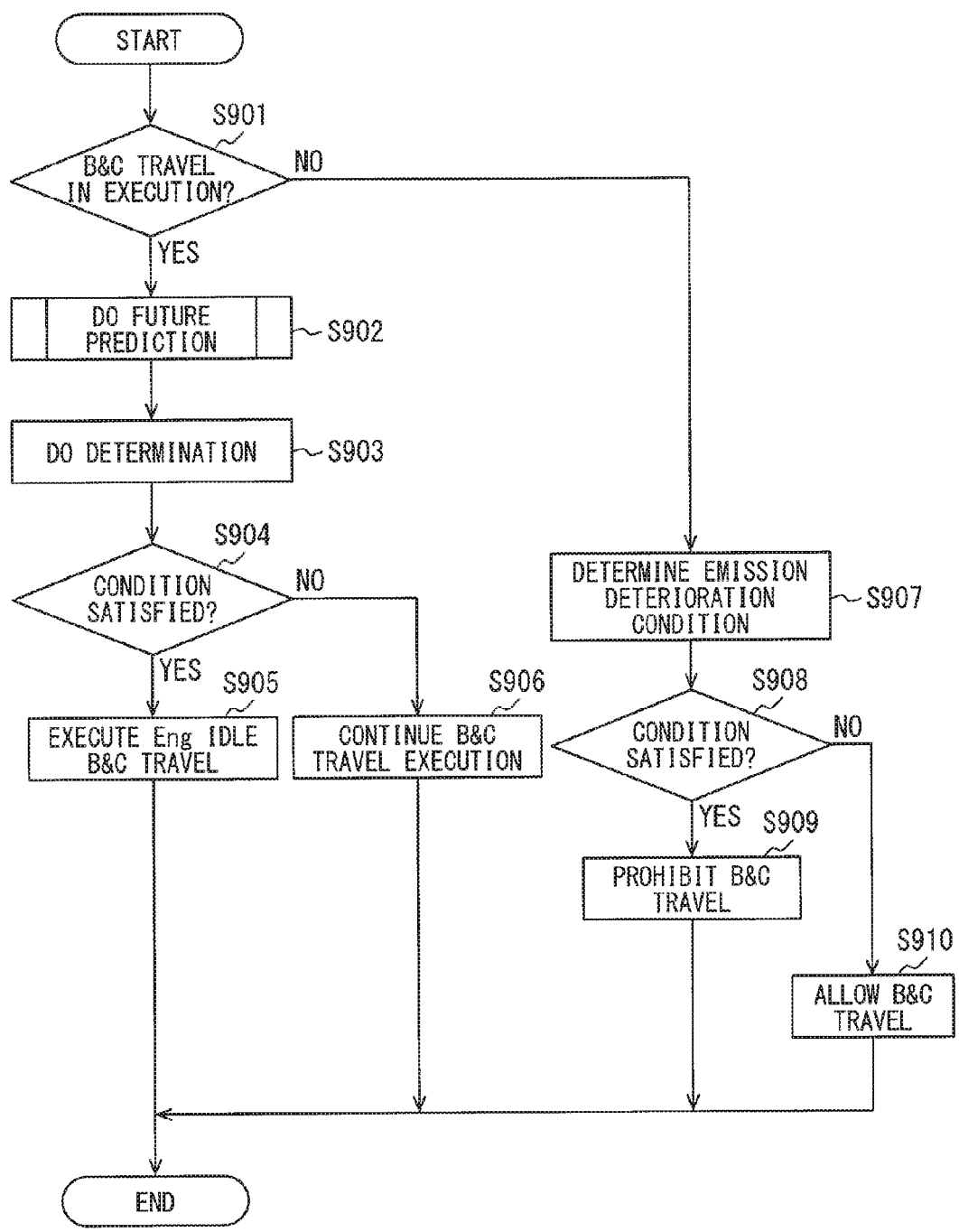
FIG. 13 is a flow chart of emission suppression control executed by a travel control apparatus according to a seventh embodiment.

Next, a seventh embodiment is described with reference to FIG. 13. A configuration of a travel control apparatus 10 according to the seventh embodiment is similar to that of the first embodiment shown in FIG. 1, and therefore an illustration thereof is omitted.

In the travel control apparatus 10 according to the seventh embodiment, the content of the emission suppression control executed by a speed controller 101 when a future emission deterioration condition is satisfied is different from that of the sixth embodiment Specifically, in the sixth embodiment, the execution of the burn-and-coast control is prohibited, however, in the seventh embodiment, in the coasting control in the burn-and-coast control, the speed controller 101 switches to control in which idle operation is performed instead of stopping the internal combustion engine 21.

A procedure of the emission suppression control executed by the travel control apparatus 10 according to the seventh embodiment is described with reference to a flow chart in FIG. 13. Each processing of S901 to S904 and S906 to S910 is similar to each processing of S701 to S704 and S706 to S710 (see FIGS. 11 and 12) of the sixth embodiment, and therefore the description thereof is omitted.

In S905, the speed controller 101 determines that the future emission deterioration condition is satisfied, and since the emission deterioration state in which the deterioration of the emission is predicted can be determined, in the coasting control in the burn-and-coast control, the control in which the idle operation of the internal combustion engine 21 is performed (described as "Eng idle B&C travel" in the drawing) is executed. After the processing of S905 is completed, the present control flow is ended.

In this way, in the travel control apparatus 10 according to the seventh embodiment, the speed controller 101 switches to the control in which the idle operation is performed instead of stopping the internal combustion engine 21 in the coasting control in the burn-and-coast control as the emission suppression control executed when the future emission deterioration condition is satisfied. With this configuration, the internal combustion engine 21 is not stopped when the deterioration of the emission is predicted during the execution of the burn-and-coast control, and the stop or the restart of the internal combustion engine 21 in the emission deterioration state can be prevented. Accordingly, decrease in the cooling water temperature and the catalyst temperature due to the stop of the internal combustion engine 21 can be suppressed, and Increase in the emission due to the restart of the internal combustion engine 21 can be suppressed. Further, since the internal combustion engine 21 is not stopped even if the coasting control is executed, the execution of the burn-and-coast control can be continued even in the emission deterioration state. As a result, the emission deterioration of the Internal combustion engine 21 can be suppressed while keeping the operation efficiency of the internal combustion engine 21 high.

(Eighth Embodiment)

Next, an eighth embodiment is described with reference to FIG. 14. A configuration of a travel control apparatus 10 according to the eighth embodiment is similar to that of the first embodiment shown in FIG. 1, and therefore an illustration thereof is omitted.

In the travel control apparatus 10 according to the eighth embodiment, the content of the emission suppression control executed by a speed controller 101 when a future emission deterioration condition is satisfied is different from that of the seventh embodiment. Specifically, the speed controller 101 switches to the control in which the idle operation is performed in the coasting control similar to the seventh embodiment, while output increase control in which output of the internal combustion engine 21 is increased is executed. Specifically, the output increase control includes control in which acceleration with respect to an input for acceleration is increased.

A procedure of the emission suppression control executed by the travel control apparatus 10 according to the eighth embodiment is described with reference to a flow chart in FIG. 14. Since each processing of S1001 to S1010 is similar to each processing of S901 to S910 (see FIG. 13) in the seventh embodiment, the description thereof is omitted.

In S1011, the control in which the acceleration with respect to the input for the acceleration is increased is executed as the output increase control by the speed controller 101 in a state in which the control in which the idle operation is performed in the coasting control is executed in S1005.

The content of the present control Is similar to S505 (see FIG. 9) of the fourth embodiment. After the processing of S1011 is completed, the present control flow is ended.

Figure 14:
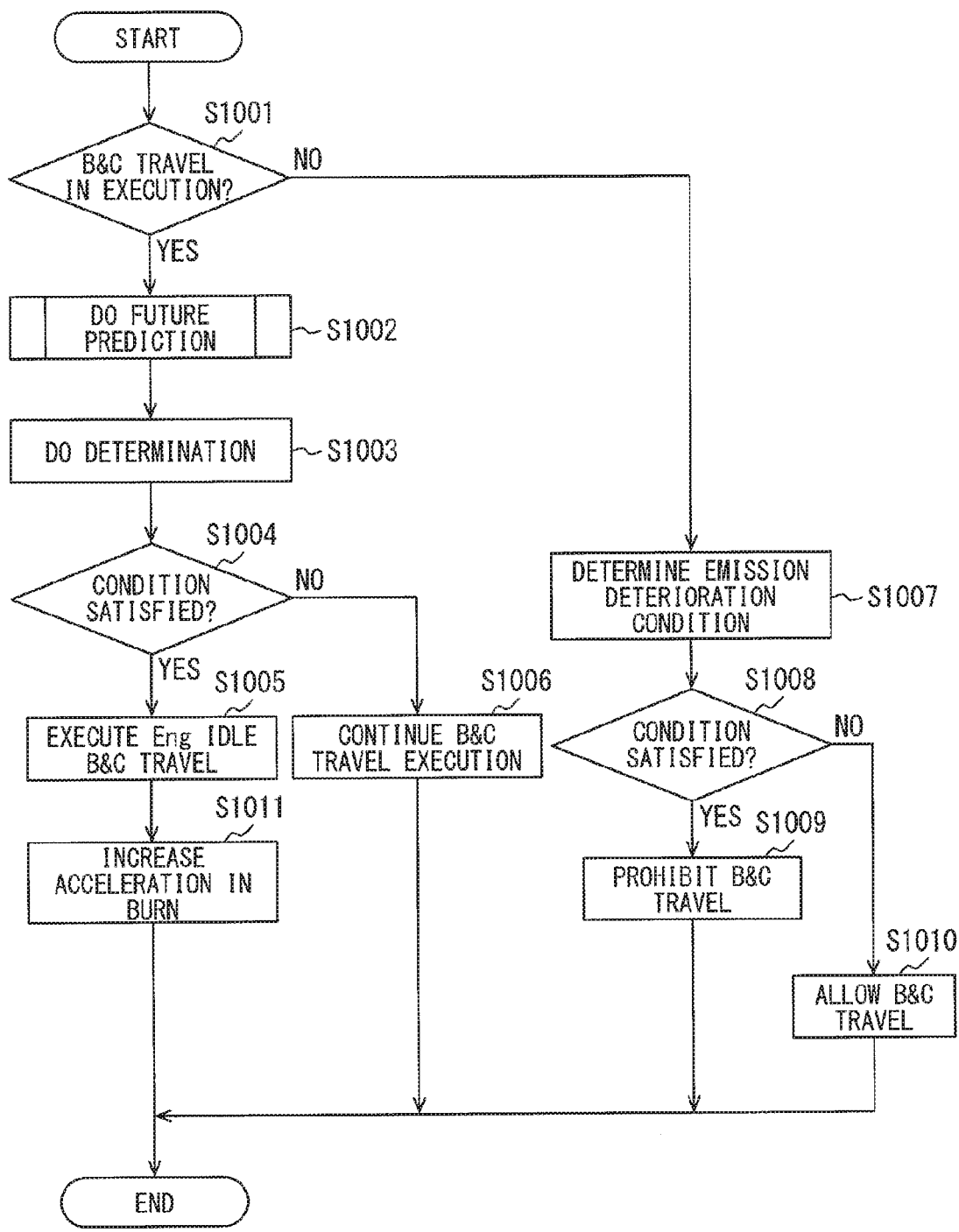
FIG. 14 is a flow chart of emission suppression control executed by a travel control apparatus according to an eighth embodiment.

Further, "control in which acceleration with respect to Input for acceleration is increased" shown in S1011 in the flow chart of FIG. 14 may be executed together with the control in which the idle operation is performed in the coasting control as shown in FIG. 14 and may be executed together with other emission suppression controls such as the control in which the burn-and-coast control is prohibited (S705 in the sixth embodiment (see FIG. 11)).

In this way, in the travel control apparatus 10 according to the eighth embodiment, the speed controller 101 executes the output increase control in which the output of the internal combustion engine 21 is increased when the emission suppression control is executed (namely, when the deterioration of the emission is predicted), in particular, the control in which the acceleration with respect to the input for the acceleration is increased. With this configuration, the output of the internal combustion engine 21 can be improved by promoting increase in the rotation speed of the internal combustion engine 21 due to acceleration operation of the vehicle 20, and thereby decrease in the cooling water temperature and the catalyst temperature can be further suppressed. As a result, the emission deterioration of the internal combustion engine 21 can be further suppressed.

(Ninth Embodiment)

Next, a ninth embodiment is described with reference to FIG. 15. A configuration of a travel control apparatus 10 according to the ninth embodiment is similar to that of the first embodiment shown in FIG. 1, and therefore an illustration thereof is omitted.

In the travel control apparatus 10 according to the ninth embodiment, the content of the emission suppression control executed by a speed controller 101 when a future emission deterioration condition is satisfied is different from that of the seventh embodiment. Specifically, the speed controller 101 switches to the control in which the idle operation is performed in the coasting control similar to the seventh embodiment, however, output increase control in which output of the internal combustion engine 21 is increased is executed. Specifically, the output increase control includes control in which a charge amount of a battery 24 is increased by the internal combustion engine 21.

A procedure of the emission suppression control executed by the travel control apparatus 10 according to the ninth embodiment Is described with reference to a flow chart in FIG. 14. Since each processing of S1101 to S1110 is similar to each processing of S901 to S910 (see FIG. 13) in the seventh embodiment, the description thereof is omitted.

In S1111, the control in which the charge amount of the battery 24 is increased by the internal combustion engine 21 (described as "Eng charge amount is increased" in the drawing) is executed as the output increase control by the speed controller 101 in a state in which the control in which the idle operation is performed in the coasting control is executed in S1105. The content of the present control is similar to S605 (see FIG. 10) of the fifth embodiment. After the processing of S1111 is completed, the present control flow is ended.

Figure 15:
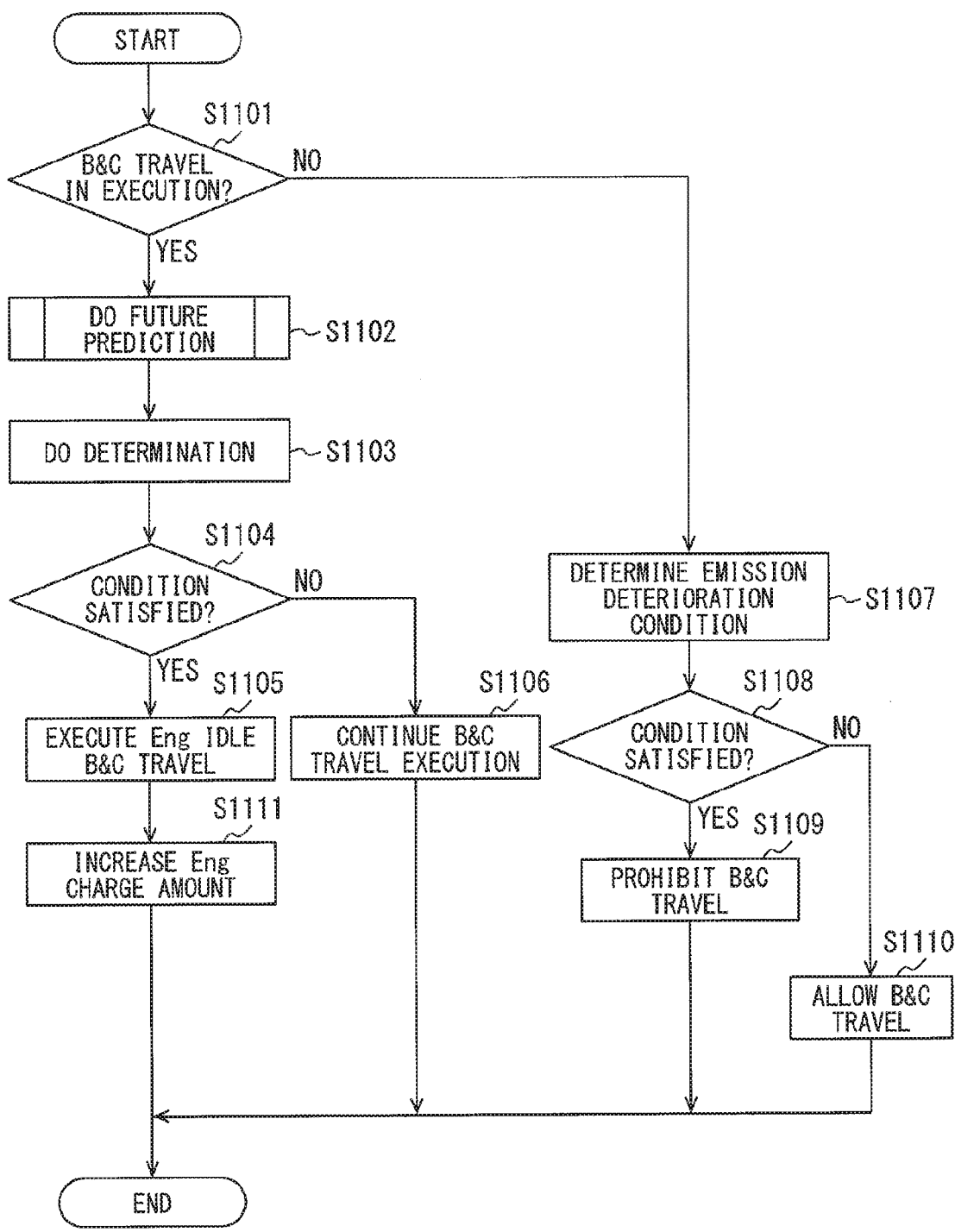
FIG. 15 is a flow chart of emission suppression control executed by a travel control apparatus according to a ninth embodiment.

Further, "control in which the charge amount of the battery 24 is increased by the internal combustion engine 21" shown in S1111 in the flow chart of FIG. 15 may be executed together with the control in which the idle operation is performed in the coasting control as shown in FIG. 15 and may be executed together with other emission suppression controls such as the control in which the burn-and-coast control is prohibited (S705 in the sixth embodiment (see FIG. 11)). Further, "control in which the charge amount of the battery 24 is Increased by the internal combustion engine 21" may be executed together with "control in which acceleration with respect to input for acceleration is increased" shown in S1011 in the eighth embodiment (see FIG. 14).

In this way, in the travel control apparatus 10 according to the ninth embodiment, the speed controller 101 executes the output increase control in which the output of the internal combustion engine 21 is increased when the emission suppression control is executed (namely, when the deterioration of the emission is predicted), in particular, the control in which the charge amount of the battery 24 is increased by the internal combustion engine 21. With this configuration, the output of the internal combustion engine 21 can be improved such that a power generation amount due to the regeneration brake of the rotation electric machine 22 is increased, and thereby decrease in the cooling water temperature and the catalyst temperature can be suppressed before the emission deterioration actually occurs. As a result, the emission deterioration of the internal combustion engine 21 can be further suppressed.

As described above, the embodiments of the present disclosure are described with reference to specific examples. However, the present disclosure is not limited to the specific examples. That is, modifications that are made by a person having ordinary skill in the art, as required, based on the specific examples are Included in the scope of the present disclosure as long as the modifications have the features of the present embodiment. For example, elements described in the specific examples, and an arrangement, a material, a condition, a shape, a size or the like of the elements are not limited to the examples described above, and can be changed suitably. Further, elements described in the embodiments can be combined as long as it is technically possible, and the combination thereof is included in the scope of the present disclosure as long as the combination has the features of the present embodiment It is noted that a flowchart or the processing of the flowchart in the present application Includes multiple steps (also referred to as sections), each of which is represented, for instance, as S101. Further, each step can be divided into several sub-steps while several steps can be combined into a single step.

While various embodiments, configurations, and aspects of a travel control apparatus according to the present disclosure have been exemplified, the embodiments, configurations, and aspects of the present disclosure are not limited to those described above. For example, embodiments, configurations, and aspects obtained from an appropriate combination of technical elements disclosed in different embodiments, configurations, and aspects are also included within the scope of the embodiments, configurations, and aspects of the present disclosure.

What is claimed is:

1. A travel control apparatus comprising:
a speed controller that controls speed of a vehicle having an internal combustion engine; and
a determination part that determines an emission deterioration state of the internal combustion engine,
wherein:
the speed controller is configured to execute burn-and-coast control that repeatedly executes burn control in which the vehicle is accelerated by driving force of the internal combustion engine, and coasting control in which generation of the driving force or rotation of the internal combustion engine is stopped so that the vehicle travels by inertia;
the speed controller is configured to execute emission suppression control that suppresses emission by adjusting the burn-and-coast control when the emission deterioration state of the internal combustion engine is determined by the determination part;
the determination part determines the emission deterioration state when deterioration of the emission is predicted; and
the determination part estimates a future cooling water temperature of the internal combustion engine, and predicts the deterioration of the emission when the future cooling water temperature is lower than a predetermined value.

2. The travel control apparatus according to claim 1, wherein:
the determination part determines the emission deterioration state when emission deterioration is detected.

3. The travel control apparatus according to claim 2, wherein:
the determination part detects deterioration of the emission when a cooling water temperature of the internal combustion engine is lower than a predetermined value.

4. The travel control apparatus according to claim 2, wherein:
the determination part detects deterioration of the emission when a catalyst temperature of the internal combustion engine is lower than a predetermined value.

5. The travel control apparatus according to claim 1, wherein:
the speed controller prohibits execution of the burn-and-coast control as the emission suppression control.

6. The travel control apparatus according to claim 1, wherein:
the speed controller switches to control in which idle operation is performed instead of stopping the internal combustion engine in the coasting control in the burn-and-coast control, as the emission suppression control.

7. The travel control apparatus according to claim 1, wherein:
the speed controller executes output increase control in which output of the internal combustion engine is increased when the emission suppression control is executed.

8. The travel control apparatus according to claim 7, wherein:
the output increase control by the speed controller includes control in which acceleration with respect to input for acceleration is increased.

9. The travel control apparatus according to claim 7, wherein:
the vehicle is a hybrid vehicle including the internal combustion engine and a rotation electric machine as a power source;
the vehicle is provided with a power storage device that provides electric power to the rotation electric machine and is charged by using at least a part of the output of the internal combustion engine; and
the output increase control by the speed controller includes control in which a charge amount of the power storage device is increased by the internal combustion engine.

10. The travel control apparatus according to claim 5, wherein:
the speed controller switches to control in which an idle operation is performed instead of stopping the internal combustion engine in the coasting control other than the burn-and-coast control when the burn-and-coast control is prohibited.

11. The travel control apparatus according to claim 1, wherein:
the vehicle is made to automatically follow another vehicle traveling ahead of the vehicle.

12. A travel control apparatus comprising:
a speed controller that controls speed of a vehicle having an internal combustion engine; and
a determination part that determines an emission deterioration state of the internal combustion engine,
wherein:
the speed controller is configured to execute burn-and-coast control that repeatedly executes burn control in which the vehicle is accelerated by driving force of the internal combustion engine, and coasting control in which generation of the driving force or rotation of the internal combustion engine is stopped so that the vehicle travels by inertia;
the speed controller is configured to execute emission suppression control that suppresses emission by adjusting the burn-and-coast control when the emission deterioration state of the internal combustion engine is determined by the determination part;
the determination part determines the emission deterioration state when deterioration of the emission is predicted; and
the determination part estimates a future catalyst temperature of the internal combustion engine, and predicts the deterioration of the emission when the future catalyst temperature is lower than a predetermined value.

13. The travel control apparatus according to claim 12, wherein:
the determination part determines the emission deterioration state when emission deterioration is detected.

14. The travel control apparatus according to claim 13, wherein:
the determination part detects deterioration of the emission when a cooling water temperature of the internal combustion engine is lower than a predetermined value.

15. The travel control apparatus according to claim 13, wherein:
the determination part detects deterioration of the emission when a catalyst temperature of the internal combustion engine is lower than a predetermined value.

16. The travel control apparatus according to claim 12, wherein:
  the speed controller prohibits execution of the burn-and-coast control as the emission suppression control.

17. The travel control apparatus according to claim 12, wherein:
  the speed controller switches to control in which idle operation is performed instead of stopping the internal combustion engine in the coasting control in the burn-and-coast control, as the emission suppression control.

* * * * *